US012703641B2

(12) United States Patent
Cheng et al.

(10) Patent No.: US 12,703,641 B2
(45) Date of Patent: Aug. 11, 2026

(54) METHODS FOR THE RECOVERY OF RARE EARTH ELEMENTS

(71) Applicant: Ohio State Innovation Foundation, Columbus, OH (US)

(72) Inventors: Chin-Min Cheng, Columbus, OH (US); Tarunjit Butalia, Dublin, OH (US); Jeffrey Bielicki, Columbus, OH (US); John Lenhart, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 921 days.

(21) Appl. No.: 17/629,727

(22) PCT Filed: Jul. 24, 2020

(86) PCT No.: PCT/US2020/043532

§ 371 (c)(1),
(2) Date: Jan. 24, 2022

(87) PCT Pub. No.: WO2021/016570

PCT Pub. Date: Jan. 28, 2021

(65) Prior Publication Data

US 2022/0289585 A1 Sep. 15, 2022

Related U.S. Application Data

(60) Provisional application No. 62/878,286, filed on Jul. 24, 2019.

(51) Int. Cl.

| | |
|---|---|
| ***C22B 3/20*** | (2006.01) |
| ***C01F 17/10*** | (2020.01) |
| ***C01F 17/206*** | (2020.01) |
| ***C22B 59/00*** | (2006.01) |

(52) U.S. Cl.
CPC ............ *C01F 17/10* (2020.01); *C01F 17/206* (2020.01); *C22B 3/20* (2013.01); *C22B 59/00* (2013.01)

(58) Field of Classification Search
None
See application file for complete search history.

(56) References Cited

U.S. PATENT DOCUMENTS

| | | | |
|---|---|---|---|
| 2,897,050 A * | 7/1959 | Jaffe | C22B 3/42 423/21.5 |
| 3,647,361 A | 3/1972 | Coltrinari et al. | |
| 4,265,862 A | 5/1981 | White et al. | |
| 4,988,487 A | 1/1991 | Lai et al. | |
| 7,531,151 B1 | 5/2009 | Aiello | |
| 8,501,124 B2 | 8/2013 | Braconnier et al. | |
| 8,936,770 B2 | 1/2015 | Burba, III | |
| 9,410,227 B2 * | 8/2016 | Boudreault | C22B 59/00 |
| 10,280,482 B2 | 5/2019 | Huang et al. | |
| 11,814,299 B2 | 11/2023 | Fan et al. | |
| 2016/0138133 A1 | 5/2016 | Pingitore, Jr. | |
| 2016/0145717 A1 | 5/2016 | Gabor et al. | |
| 2018/0245181 A1 | 8/2018 | Hoshi et al. | |
| 2019/0160394 A1 | 5/2019 | Prodius et al. | |
| 2021/0347652 A1 | 11/2021 | Fan et al. | |

FOREIGN PATENT DOCUMENTS

| | | |
|---|---|---|
| CN | 105132719 | * 12/2015 |
| CN | 109604318 | * 4/2019 |
| GB | 2343674 A | * 5/2000 |
| WO | 2018221502 | * 12/2018 |

OTHER PUBLICATIONS

International Search Report and Written Opinion, issued by the International Searching Authority (ISA/US) in PCT Application No. PCT/US2020/043532 on Oct. 26, 2020. 9 pages.

Cheng et al. “Recovering rare earth elements from acid mine drainage through abandoned mine land reclamation.” National Energy Technology Laboratory. May 2019. 35 pages.

* cited by examiner

*Primary Examiner* — Sheng H Davis
(74) *Attorney, Agent, or Firm* — Meunier Carlin & Curfman LLC

(57) ABSTRACT

Provided herein are methods recovering rare earth elements (REEs) from a solution containing one or more REEs. These methods can comprise contacting an aqueous solution comprising one or more rare earth elements (REEs) with a solid sequestration media (e.g., a stabilized flue gas desulfurization (sFGD) material, or a sludge by-product from a water treatment process) to provide a REE-containing solid feedstock; and contacting the solid feedstock with an extraction solution to generate a rare earth element (REE) solution.

19 Claims, 15 Drawing Sheets

METHODS FOR THE RECOVERY OF RARE EARTH ELEMENTS

CROSS-REFERENCE TO RELATED APPLICATIONS

This application claims benefit of U.S. Provisional Application No. 62/878,286, filed Jul. 24, 2019, which is hereby incorporated herein by reference in its entirety.

STATEMENT OF GOVERNMENT SUPPORT

This invention was made with government support under grant/contract number DE-FE0031566 awarded by the Department of Energy. The government has certain rights in the invention.

STATEMENT REGARDING FEDERALLY SPONSORED RESEARCH OR DEVELOPMENT

This invention was made with government support under grant number DE-FE0031566 awarded by the Department of Energy. The government has certain rights in the invention.

BACKGROUND

The demand of rare earth elements (REEs) in the productions of turbines and electric motor for renewable energy, military equipment, and consumer electronic products has been projected to be growing at an annual rate of 5-9% in the next 25 years. In 2011, the global demand of total rare earth oxides was estimated to be approximately 105,000 tons, which is expected to grow to 210,000 tons by 2025. China dominates the current worldwide REEs mine production (over 70%) but has strategically restricted its exports of REEs, causing significant instability for the market. In response to the increasing global demand and the supply dominance of China, finding alternative sources of REEs have become a critical national security issue for other countries, including the United States.

At the same time, acid mine drainage (AMD) represents a significant environmental concern. AMD forms when sulfide minerals in rocks are exposed to oxidizing conditions in coal and metal mining, highway construction, and other large-scale excavations. There are many types of sulfide minerals, but iron sulfides common in coal regions, pyrite and marcasite ($FeS_2$), are the predominant AMD producers. Upon exposure to water and oxygen, pyritic minerals oxidize to form acidic, iron and sulfate-rich drainage. The drainage quality emanating from underground mines or backfills of surface mines is dependent on the acid-producing (sulfide) and alkaline (carbonate) minerals contained in the disturbed rock. In general, sulfide-rich and carbonate-poor materials are expected to produce acidic drainage. In contrast, alkaline-rich materials, even with significant sulfide concentrations, often produce alkaline conditions in water. Acidity in AMD is comprised of mineral acidity (iron, aluminum, manganese, a metals depending on the specific geologic setting and metal sulfide) and hydrogen ion acidity. Approximately 20,000 km of streams and rivers in the United States are degraded by AMD. Therefore, methods for eliminating or reducing acidity and heavy metal precipitation from impacted waters are also needed.

SUMMARY

Provided herein are methods recovering rare earth elements (REEs) from a solution containing one or more REEs. These methods can comprise contacting an aqueous solution comprising one or more rare earth elements (REEs) with a solid sequestration media (e.g., a stabilized flue gas desulfurization (sFGD) material, or a sludge by-product from a water treatment process) to provide a REE-containing solid feedstock; and contacting the solid feedstock with an extraction solution to generate a rare earth element (REE) solution.

The aqueous solution can comprise any solution or suspension that comprises one or more REEs. In certain embodiments, the aqueous solution can comprise any solution or suspension that comprises a mixture of REEs. In some embodiments, the aqueous solution can comprise acid mine drainage (AMD). The concentration of REEs in the aqueous solution can be less than 1,000 ppm.

The solid sequestration media can comprise a variety of suitable inorganic materials. In some embodiments, the solid sequestration media can comprise a calcium salt, such as calcium sulfate, calcium sulfite, calcium carbonate, or a combination thereof. In some embodiments, the solid sequestration media can comprise an inorganic industrial waste material (e.g., a stabilized flue gas desulfurization (sFGD) material, a sludge by-product from a water treatment process, such as lime sludge, or a combination thereof).

In some embodiments, contacting the aqueous solution with the solid sequestration media can comprise flowing the aqueous solution through a fixed bed comprising the solid sequestration media. In these embodiments, the method can further comprise constructing the fixed bed comprising the sFGD in proximity to a mine emitting AMD, and fluidly connecting the fixed bed to the mine such that AMD emitted from the mine flows through the fixed bed.

The concentration of REEs in the resulting solid feedstock can be less than 1000 ppm.

The extraction solution can comprise a chelating agent and a reducing agent. In some embodiments, the chelating agent can comprise a polydentate carboxylate ligand such as citrate. In some embodiments, the reducing agent can comprise a dithionite.

In some embodiments, the concentration of REEs in the REE solution can be at least ten times greater than the concentration of REEs in the solid feedstock.

Optionally, the method can further comprise concentrating the REE solution.

Optionally, the method can further comprise separating the REEs from the REE solution to form a rare earth oxide (REO) feedstock. In some embodiments, the concentration of REEs in the REO feedstock is at least twenty times greater than the concentration of REEs in the solid feedstock. In some embodiments, the ratio of the concentration of REEs in the REO feedstock to the to the concentration of REEs of the solid feedstock can be from 20:1 to 100:1.

Also provided herein are methods for remediating an abandoned mine site. These methods can comprise constructing a fixed bed comprising a solid sequestration media in proximity to a mine emitting acid mine drainage (AMD); fluidly connecting the fixed bed to the mine such that AMD emitted from the mine flows through the fixed bed and contacts the solid sequestration media; burying the fixed bed; allowing the AMD to contact the solid sequestration media within the fixed bed to provide a rare earth element-containing (REE-containing) solid feedstock within the fixed bed; removing the REE-containing solid feedstock from the fixed bed; contacting the REE-containing solid feedstock with an extraction solution to generate a rare earth element (REE) solution; and separating the REEs from the REE solution to form a rare earth oxide (REO) feedstock.

In some embodiments, burying the fixed bed can comprise covering the fixed bed with mine overburden, planting vegetation on top of the fixed bed, or a combination thereof.

In some embodiments, the fixed bed can comprise a geotextile drainage system that fluidly connects the fixed bed to the mine.

DESCRIPTION OF DRAWINGS

FIG. 10A is a plot showing the total mass of REEs introduced into each of selected column tests and the mass escaped using sFGD 1, WTP sludge, and sFGD 3 at different flow rates. FIG. 10B illustrates the breakthrough of REEs in Column D after sFGD 1 exhausted neutralization capacity. FIG. 10C illustrates the retaining efficiency of individual REEs.

FIG. 16A shows the extract before purging. FIG. 16B shows the extract during purging. FIG. 16C shows the extract after purging.

DETAILED DESCRIPTION

Definitions

Figure 1A:
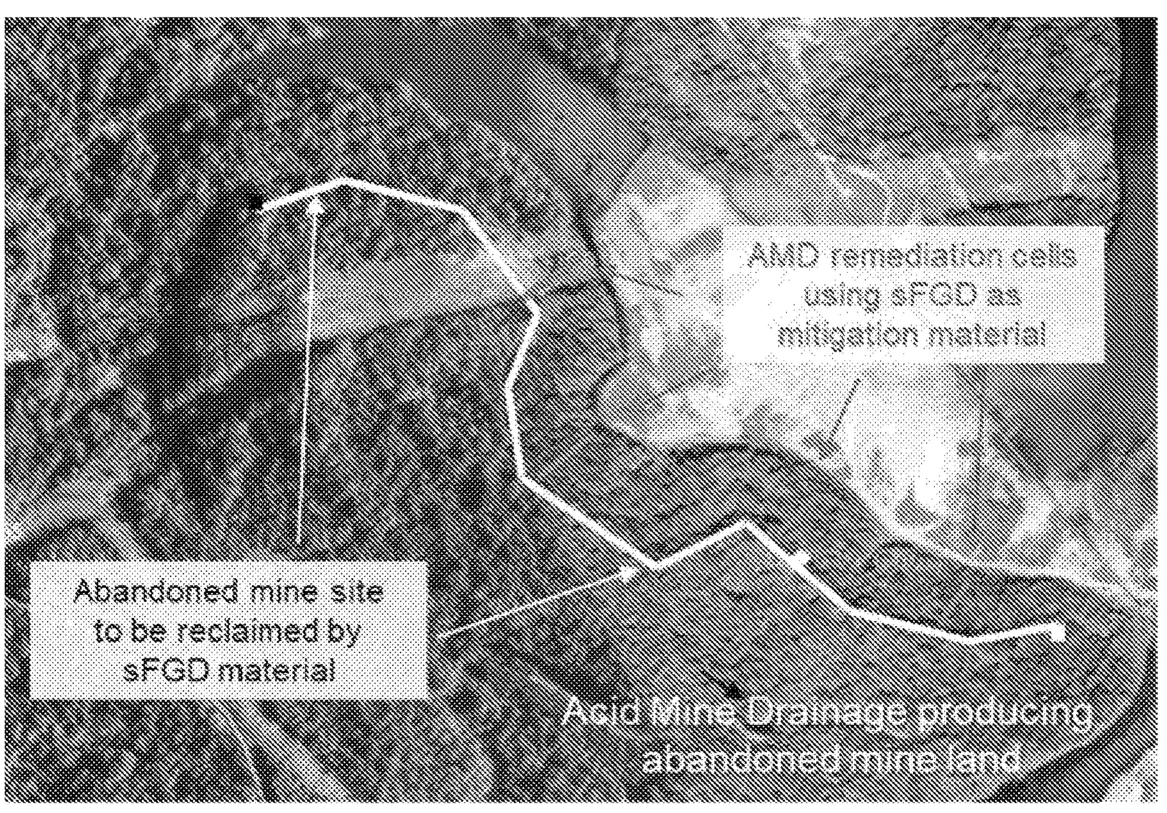
FIGS. 1A-1D schematically illustrate a concept that integrates a trap-extract-precipitate (TEP) process and AML reclamation.

The following terms will be used throughout the specification and will have the following meanings unless otherwise indicated.

"ppm" refers to parts per million. One ppm is equivalent to 1 mg per liter.

"Tailings" or "tailing" (also known as slimes, tails, or leach residue) refers to waste or materials remaining after the process of separating the valuable fraction from the uneconomic fraction of an ore.

Overburden or waste rock refers to the materials overlying an ore or mineral body that are displaced during mining without being processed.

"AMD" or acid mine drainage, or acid rock drainage (ARD), refers to effluents from extractions and/or excavations, characterized by acidity and metals which may include aluminum, antimony, cadmium, chromium, cobalt, copper, iron, lead, magnesium, manganese, molybdenum, nickel, zinc and others. In one embodiment, AMD is a consequence of the decomposition of pyrite ($FeS_2$) and pyrrohotite [$Fe_{(1-x)}S$] in waste rock upon exposure to water and oxygen, resulting in the groundwater becoming acidified and contaminated with dissolved metals and sulfates.

The term mine here includes mining, referring to active, inactive, or abandoned extraction and or excavation operations for removing minerals, metals, ores and/or coal from the earth. Examples of extraction operations include minerals, metals and ores including limestone, talc, gold, silver, iron, zinc, manganese, molybdenum, antimony, chromium, and nickel.

Methods

Described herein are methods that involve a two-stage, trap-and-concentrate (TAC) process (also referred to as a trap-extract-and-precipitate (TEC) process) that uses by-products from coal combustion and water treatment to treat acid mine drainage (AMD) and recover rare earth elements (REEs). The two stages of the TAC process involve the use of by-products to capture REEs from AMD (AMD REEs) and then the application of a concentrating procedure to produce a feedstock that can be economically processed to produce rare earth oxides (REO feedstock).

Based on the water samples collected from AMD discharges located in eastern and southeastern Ohio, the flux of REEs in AMD discharges can be as high as approximately 2.6 metric ton per year. On average, over 47% of the total REEs were critical REEs. Three example solids (i.e., stabilized flue gas desulfurization (sFGD) materials from two different processes using scrubbing solutions prepared from limestone and lime, and sludge from a water treatment plant) were evaluated as REE-trapping media in a series of laboratory-scale column studies. sFGD material is a mixture of lime (CaO), calcium sulfite FGD by-product, and coal ash. The laboratory-scale column studies showed that all three solids were very effective in separating REEs from AMD, with over 99% of the AMD REEs that contact the solids being quickly entrapped under all of the percolation conditions evaluated. A citrate-bicarbonate-dithionite solution was then applied to extract over 90% of the entrapped REEs from the spent solids. The solution was then purged with air and dried to produce a REO feedstock with enriched REE concentrations. The REO feedstock could then be used as an economically viable source for the isolation of REEs.

Critical components of emerging technologies use these REEs (including scandium, yttrium and a group of 15 lanthanides), and thus their demand is projected to grow substantially over the coming decades. Due to significant supply instability and price volatility, the United States and other countries have made finding alternative sources of REEs a strategic priority.

Because of its high REE content, acid mine drainage (AMD) is a promising alternative source for REEs. Based on the results described herein, the TAC process described herein can be integrated with abandoned mine land (AML) reclamation to create an approach that can provide reliable economic incentives to restore lands that are adversely impacted by historical mining. Furthermore, this reclamation approach can provide a long-term, high-volume beneficial use for high-volume by-products (e.g., sFGD, lime sludge, etc.) which otherwise need to be disposed of in a landfill.

Accordingly, provided herein are methods recovering rare earth elements (REEs) from a solution containing one or more REEs. These methods can comprise contacting an aqueous solution comprising one or more rare earth elements (REEs) with a solid sequestration media (e.g., a stabilized flue gas desulfurization (sFGD) material, or a sludge by-product from a water treatment process) to provide a REE-containing solid feedstock; and contacting the solid feedstock with an extraction solution to generate a rare earth element (REE) solution.

The aqueous solution can comprise any solution or suspension that comprises one or more REEs. In certain embodiments, the aqueous solution can comprise any solution or suspension that comprises a mixture of REEs (e.g., two or more REEs, three or more REEs, four or more REEs, five or more REEs, or ten or more REEs)

In some examples, the one or more REEs can be chosen from scandium, yttrium, lanthanum, cerium, praseodymium, neodymium, promethium, samarium, europium, gadolinium, dysprosium, erbium, ytterbium and mixtures thereof.

In some examples, the one or more REEs can be chosen from scandium, gallium, yttrium, lanthanum, cerium, praseodymium, neodymium, promethium, samarium, europium, gadolinium, dysprosium and mixtures thereof.

In some examples, the one or more REEs can be chosen from scandium, gallium, yttrium, cerium and mixtures thereof. In some embodiments, the aqueous solution can comprise yttrium. In some embodiments, the aqueous solution can comprise scandium. In some embodiments, the aqueous solution can comprise gallium. In some embodiments, the aqueous solution can comprise cerium.

In some embodiments, the aqueous solution can be a leachate from an ore containing REEs, or a slurry or suspension comprising an ore containing REEs. In some embodiments, the aqueous solution can comprise an industrial waste stream comprising REEs. In some embodiments, the aqueous solution can comprise an aqueous solution comprising REEs generated during a REE refining process. In some embodiments, the aqueous solution can comprise an aqueous solution comprising REEs generated during a REE recycling process.

In some embodiments, the aqueous solution can comprise acid mine drainage (AMD). As used herein, the term AMD refers to the water to be treated, which includes all sources of effluents from excavations, including AMD as well as tailings water and effluents, seepage from tailings facilities, leach residues, as well as seepage, well water, mine water and effluents from waste rock piles obtained from the excavation.

Depending on the location and amount of mineral deposits, the AMD in one embodiment is from an ore containing materials including magnetite, zircon, rutile, manganosiderite, fluorite, molybdenite, chalcopyrite, sphalerite, galena, fluorite. In one embodiment, some ores may include light gravity minerals (less than 2.9 specific gravity) such as quartz, orthoclase, oligoclase, biotite, calcite, and chlorite.

Depending on the ore location, the mineralogy of AMD in one embodiment may comprise quartz, plagioclase feldspar, potassium feldspar, biotite, chlorite, amphibole, calcite and sulfide minerals. The sulfide minerals in one embodiment include pyrite, sphalerite, chalcopyrite and molybdenite with trace amounts of galena, covellite and pyrrohotite, with the minerals as potential sources of acidity and dissolved metals including aluminum, cadmium, chromium, cobalt, copper, iron, lead, magnesium, manganese, molybdenum, nickel, zinc and others.

Depending on the source, the excavation means, the tailing impoundment means, the water source, the AMD in one embodiment contains soluble species including but not limited to fluorides, sulfates, cadmium, cobalt, manganese, molybdenum, and nickel. In another embodiment, the AMD contains one or more metal ions or salts of iron, copper, zinc, lead, mercury, cadmium, arsenic, barium, selenium, silver, chromium, aluminum, manganese, nickel, cobalt, uranium, and antimony. In one embodiment, the water has a positive LSI.

In one embodiment, the AMD has a pH from 2.0 to 10.0; often from 3.0 to 6.0 and typically in the range of 3.5 to 5.5. The AMD has a calcium hardness of greater than 200 ppm in one embodiment; greater than 400 ppm in a second embodiment; and greater than 600 ppm in a third embodiment.

The concentration of REEs in the aqueous solution can vary. In some embodiments, the concentration of REEs in the aqueous solution can be less than 1,000 ppm (e.g., less than 900 ppm, less than 800 ppm, less than 750 ppm, less than 700 ppm, less than 600 ppm, less than 500 ppm, less than 400 ppm, less than 300 ppm, less than 250 ppm, less than 200 ppm, less than 100 ppm, less than 50 ppm, less than 25 ppm, less than 10 ppm, less than 5 ppm, less than 1 ppm, or less).

The solid sequestration media can comprise a variety of suitable inorganic materials. In some embodiments, the solid sequestration media can comprise a calcium salt, such as calcium sulfate, calcium sulfite, calcium carbonate, calcium hydroxide, aluminum silicate, iron oxide, or a combination thereof. In some embodiments, the solid sequestration media can comprise an inorganic industrial waste material (e.g., a stabilized flue gas desulfurization (sFGD) material, a fly ash (coal ash), a sludge by-product from a water treatment process, such as lime sludge, or a combination thereof).

The solid sequestration media can be disposed within any suitable vessel so as to facilitate treatment of the aqueous solution with the solid sequestration media. In some cases, the stationary phase can be disposed within a fixed bed (a fixed bed reactor). In these embodiments, contacting the aqueous solution with the solid sequestration media can comprise flowing the aqueous solution through a fixed bed comprising the solid sequestration media. If desired, pressure can be applied to facilitate flow of the aqueous solution through the solid sequestration media, with the applied pressure being varied to control flow rate of the aqueous solution through the solid sequestration media. Alternatively, the aqueous solution can be allowed to percolate through the solid sequestration media (e.g., by gravity flow).

The contact time of the aqueous solution with the solid sequestration media can be defined by calculation of the empty bed contact time (EBCT). The EBCT of the solid sequestration media is defined by the formula below $$EBCT = \frac{(7.48 \times V)}{Q}$$

wherein EBCT is the empty bed contact time of the solid sequestration media in minutes; V is the volume of the solid sequestration media in cubic feet; and Q is the flow rate of the aqueous solution in gallons per minute. In some embodiments, the volume of the solid sequestration media and the flow rate of the aqueous solution through the solid sequestration media are effective to yield an empty bed contact time of 1.5 hours or more (e.g., 2 hours or more, 2.5 hours or more, 3 hours or more, 4 hours or more, 5 hours or more, 6 hours or more, 8 hours or more, 10 hours or more, 12 hours or more, 18 hours or more, or 24 hours or more).

The aqueous composition can be flowed through the solid sequestration media at a flow rate effective to retain at least 40% (e.g., at least 45%, at least 50%, at least 55%, at least 60%, at least 65%, at least 70%, at least 75%, at least 80%, at least 85%, at least 90%, or at least 90%) of the REEs present in the aqueous solution within the solid sequestration media (forming an REE-containing solid feedstock).

In embodiments where a fixed bed is employed, the method can further comprise constructing the fixed bed comprising the sFGD in proximity to a mine emitting AMD, and fluidly connecting the fixed bed to the mine such that AMD emitted from the mine flows through the fixed bed.

The concentration of REEs in the resulting solid feedstock can be less than 1000 ppm (e.g., less than 900 ppm, less than 800 ppm, less than 750 ppm, less than 700 ppm, less than 600 ppm, less than 500 ppm, less than 400 ppm, less than 300 ppm, less than 250 ppm, less than 200 ppm, less than 100 ppm, less than 50 ppm, less than 25 ppm, less than 10 ppm, less than 5 ppm, less than 1 ppm, or less).

The extraction solution can comprise a chelating agent and a reducing agent. In some embodiments, the chelating agent can comprise a polydentate ligand. The polydentate ligand can comprise a carboxylate ligand (e.g., a polycarboxylate), an amino ligand (e.g., a polyamine), or a phosphate ligand. In some embodiments, the chelating agent can comprise a polydentate carboxylate ligand, such as citrate (e.g., citric acid or a salt thereof), oxalate (oxalic acid or a salt thereof), and/or ethylenediaminetetraacetic acid (EDTA) or a salt thereof. The reducing agent can comprise any suitable reducing agent, such as a dithionite, a sulfite, or a thiosulfate.

In some embodiments, the extraction solution can further comprise a base, such as sodium bicarbonate. In some embodiments, the extraction solution can have a pH of greater than 7, such as a pH of from 7.5 to 12.

In some embodiments, the concentration of REEs in the REE solution can be at least ten times greater (e.g., at least 15 times greater, at least 20 times greater, at least 25 times greater, at least 50 times greater, at least 100 times greater, of more) than the concentration of REEs in the solid feedstock.

Optionally, the method can further comprise concentrating the REE solution.

Optionally, the method can further comprise separating the REEs from the REE solution to form a rare earth oxide (REO) feedstock. This can be formed through any suitable method, such as aeration and/or precipitation.

The concentration of REEs in the REO feedstock can be at least twenty times greater (e.g., at least 25 times greater, at least 30 times greater, at least 40 times greater, at least 50 times greater, at least 100 times greater, or more) than the concentration of REEs in the solid feedstock.

In some embodiments, the ratio of the concentration of REEs in the REO feedstock to the to the concentration of REEs in the solid feedstock (in terms of mols of REEs) can be at least 20:1 (e.g., at least 25:1, at least 30:1, at least 35:1, at least 40:1, at least 45:1, at least 50:1, at least 55:1, at least 60:1, at least 65:1, at least 70:1, at least 75:1, at least 80:1, at least 85:1, at least 90:1, or at least 95:1). In some embodiments, the ration of the concentration of REEs in the REO feedstock to the concentration of REEs in the solid feedstock can be 100:1 or less (e.g., 95:1 or less, 90:1 or less, 85:1 or less, 80:1 or less, 75:1 or less, 70:1 or less, 65:1 or less, 60:1 or less, 55:1 or less, 50:1 or less, 45:1 or less, 40:1 or less, 35:1 or less, 30:1 or less, or 25:1 or less).

The ratio of the concentration of REEs in the REO feedstock to the to the concentration of REEs in the solid feedstock can range from any of the minimum values described above to any of the maximum values described above. For example, in some embodiments, the ratio of the concentration of REEs in the REO feedstock to the to the concentration of REEs in the solid feedstock can range from 20:1 to 100:1.

Also provided herein are methods for remediating an abandoned mine site. These methods can comprise constructing a fixed bed comprising a solid sequestration media in proximity to a mine emitting acid mine drainage (AMD); fluidly connecting the fixed bed to the mine such that AMD emitted from the mine flows through the fixed bed and contacts the solid sequestration media; burying the fixed bed; allowing the AMD to contact the solid sequestration media within the fixed bed to provide a rare earth element-containing (REE-containing) solid feedstock within the fixed bed; removing the REE-containing solid feedstock from the fixed bed; contacting the REE-containing solid feedstock with an extraction solution to generate a rare earth element (REE) solution; and separating the REEs from the REE solution to form a rare earth oxide (REO) feedstock.

In some embodiments, burying the fixed bed can comprise covering the fixed bed with mine overburden, planting vegetation on top of the fixed bed, or a combination thereof.

In some embodiments, the fixed bed can comprise a geotextile drainage system that fluidly connects the fixed bed to the mine.

EXAMPLES

The invention will be described in greater detail by way of specific examples. The following examples are offered for illustrative purposes, and are not intended to limit the invention in any manner. Those of skill in the art will readily recognize a variety of non-critical parameters which can be changed or modified to yield essentially the same results.

Example 1. Concentrating Rare Earth Elements in Acid Mine Drainage Using Coal Combustion Products Through Abandoned Mine Land Reclamation In this example, a three-stage, trap-extract-precipitate (TEP) process was developed to recover rare earth elements (REEs) from acid mine drainage (AMD). The process first uses alkaline industrial by-products (e.g., stabilized flue gas desulfurization materials (sFGD) and sludge produced from the lime softening process of a water treatment plant) to retain REEs. In the second stage of the process, an extraction procedure using naturally occurring organic ligand to remobilize retained REEs from the spent solids. In the third stage, an oxidation process was applied to the extract to produce a REE concentrate with a concentration above 2 wt. % of total REE as element (T-REEe). sFGD is a mixture of lime (CaO) and two coal combustion by-products, calcium sulfite FGD by-product and fly ash. The objectives of this example are to (1) validate the effectiveness and feasibility of the TEP process; (2) determine mechanisms controlling the rare earth recovery, (3) quantify the associated economic and environmental benefits, and (4) evaluate the full-scale application. This proposed process can be integrated with abandoned mine land (AML) reclamation to create an approach that can (1) add economic incentives for AML reclamation, (2) remediate AMD discharge, (3) provide a long-term, high-volume beneficial use for coal combustion by-products, which otherwise needs to be disposed of in a landfill, and (4) eliminate public safety hazards and threats to local environment and ecological systems posed by AMLs.

BACKGROUND

The demand of rare earth elements (REEs) in the productions of turbines and electric motor for renewable energy, military equipment, and consumer electronic products has been projected to be growing at an annual rate of 5-9% in the next 25 years. In 2011, the global demand of total rare earth oxides was estimated to be approximately 105,000 tons, which is expected to grow to 210,000 tons by 2025. China dominates the current worldwide REEs mine production (over 70%) but has strategically restricted its exports of REEs, causing significant instability for the market. In response to the increasing global demand and the supply dominance of China, finding alternative sources of REEs have become a critical national security issue for other countries, including the United States.

In the U.S., high concentrations of REEs have been reported to be closely associated with coal deposits, including the Appalachian Basins. Compared to coal, coal ash has higher concentrations of REEs. Coal combustion process concentrates rare earths in coal ash by a factor of approximately 6.

Recovering REEs from AMD. An important alternative source of rare earths associated with coal is AMD. When surface and/or groundwater come in contact with geologic strata containing sulfide minerals exposed by coal mining, the accelerated oxidation of sulfide minerals in the presence of natural oxidants (e.g., ferric iron and oxygen) can produce sulfuric acid and consequently promote the weathering of REE-bearing rocks and minerals in the host geologic strata. Comprehensive investigations studying the abandoned coal mine discharges in Pennsylvania have concluded that, compared to average river water and seawater, the concentrations of rare earths can be orders of magnitude higher in AMD. Rare earths likely retain their ionic forms in acid streams but can partition in the solid phase as pH becomes higher. It is, therefore, plausible and feasible to separate and recover rare earths from AMD by changing the hydrochemical property.

The retention of rare earths by a multi-stage sequential treatment of AMD using calcite and magnesium oxide as the neutralization agents has been investigated. Results from these efforts suggest that AMD-REEs can be effectively concentrated in the mitigation material during neutralization. AMD mitigation can be considered as a suitable rare earth source. However, no recovery investigation using these mitigation materials. The recovery of rare earths from the sludge of AMD remediation system has been investigated. The concentrations observed in the two reported AMD sludge samples are approximately 0.07 wt % T-REEe. AMD remediation systems are normally operated at active mine sites. In the United States, mining companies are required to treat AMD to meet federal effluent limits based on the quality of the receiving water bodies for active mining operations. However, there are many AMDs discharging from abandoned mine sites, where mining activities occurred prior to current state and federal mining regulations, and therefore, remain untreated.

In a survey carried out by the U.S. Forest Service, it was estimated that there are between 8,000 and 16,000 km of streams in the western U.S. region were impacted by AMD. United States Environmental Protection Agency (USEPA) estimated that more than 6400 km of stream in the Appalachian Region was impacted by AMD. In the state of Ohio, approximately 1,300 miles of streams are currently polluted by AMD from abandoned mines. Implementing adequate treatment systems for these abandoned AMDs is limited by funds available for the state and federal reclamation agencies, local conservation organizers, and watershed associates. Finding a low-cost approach that can effectively recover REEs while remediate AMD and reclaim AMLs provides opportunity for areas that have been adversely impacted by previous mining to be restored.

Integrating REE Recovery and Abandoned Mine Land Reclamation. Using coal combustion by-products (CCBs), such as sulfate-rich FGD gypsum and sulfite-rich sFGD, to backfill AML and mitigate CMD can be an effective and economically viable reclamation approach. This approach can reduce the consumption of natural resources (e.g., soil, limestone, and construction of new landfill sites) and costs associated with the handling and disposal of CCBs (e.g., trucking and landfilling fees). The cost saving can enable the approach to reclaim abandoned mine lands often without the use of public AML reclamation funds. In addition, CCBs can improve the physical (e.g., landscape, soil texture and water holding capacity), and chemical (e.g., alkalinity and nutrients) characteristics of AMLs. The National Research Council (NRC) examined the health, safety, and environmental risks associated with the practice of using CCBs for reclamation in active and abandoned coal mines. The study concluded the practice is a viable management option as long as CCB placement is properly planned and is carried out in a manner that avoids significant adverse environmental and health impact.

Field studies have evaluated and demonstrated this mine land reclamation approach using different CCBs, including sFGD, as backfill material. Initial projects were small scale with low volume use of FGD material. With the success of the initial project, and further advanced understandings about the environmental and engineering characteristics of CCBs, full-scale projects using a high volume of CCBs in AML reclamation were carried out. Two demonstration projects, Conesville Five Points and the Cardinal Star Ridge, showcase the full capability of using CCBs, sFGD and FGD gypsum, in mine reclamation. As a result of the successful completion of these two demonstration projects, the power generation utility has moved forward with continuation projects under the guidelines established by the regulatory authority in mine reclamation. In essence, the technology has reached full-scale commercialized implementation. Although costs are difficult to obtain, it is apparent the local utilities are pursuing beneficial use of the FGD materials in mine reclamation as an alternative to landfilling this material. This beneficial use will clearly extend the life of existing landfills and reclaim abandoned mined lands (AML) at little or no cost to the regulatory authority administering AML reclamation.

The TEP process can be integrated with AML reclamation to create an approach that can (1) add economic incentives to AML reclamation, (2) remediate AMD discharge, (3) provide a long-term, high-volume beneficial use for coal combustion by-products, which otherwise needs to be disposed of in a landfill, and (4) eliminate public safety hazards and threats to local environment and ecological systems posed by AMLs.

Figure 1B:
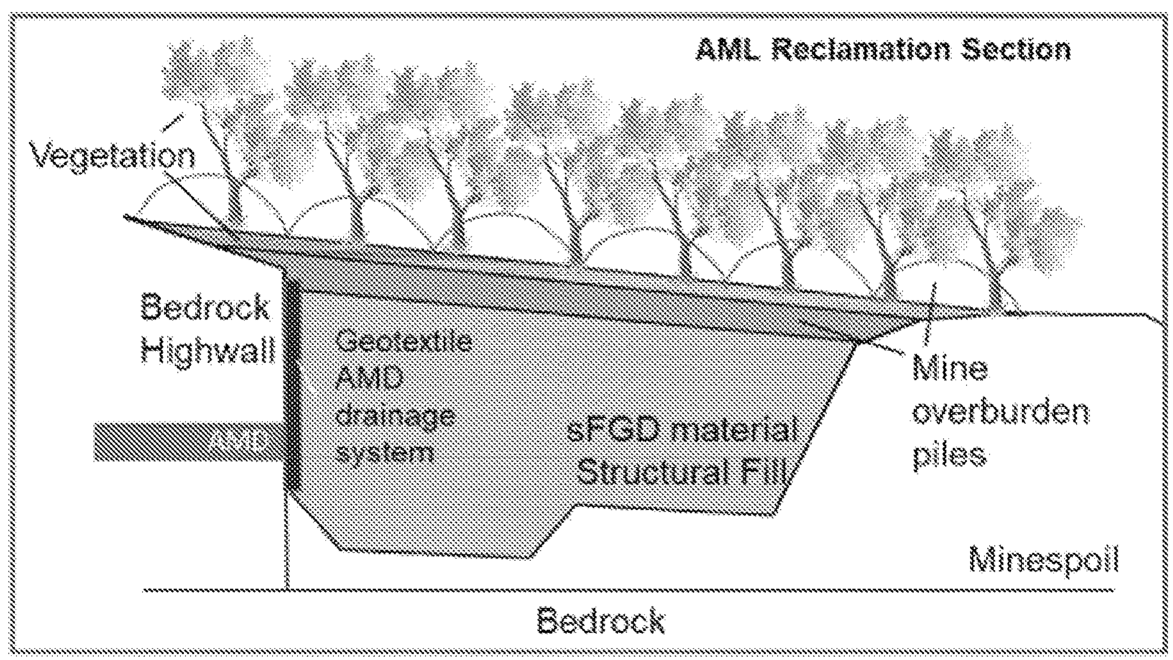
Figure 1C:
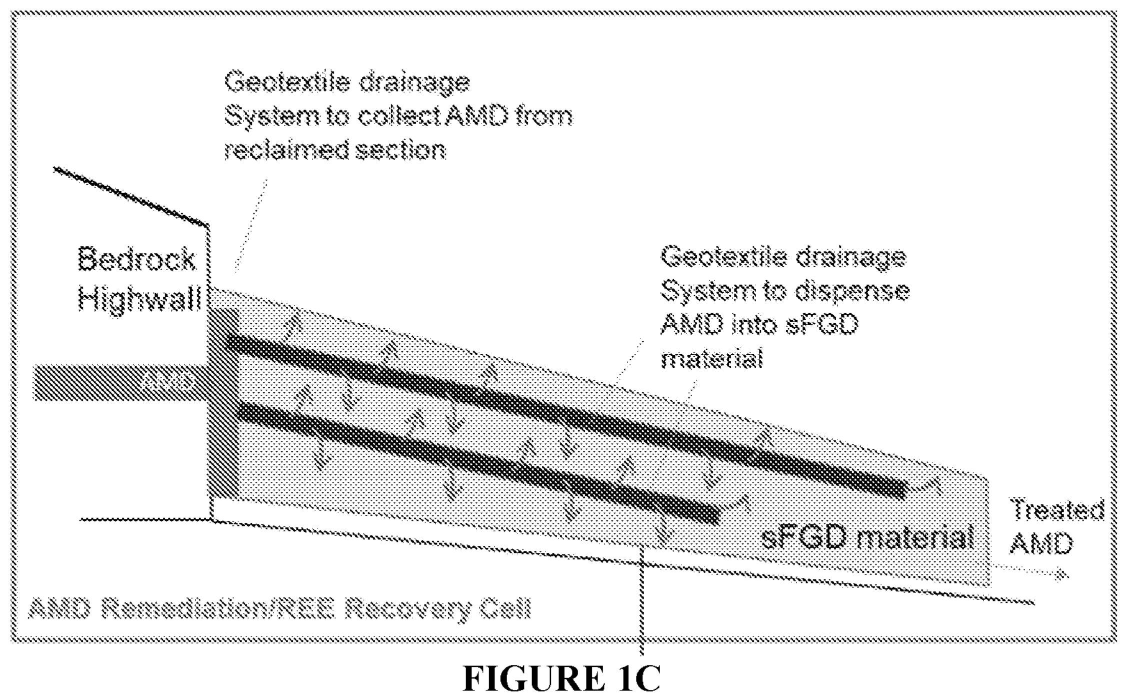
Figure 1D:
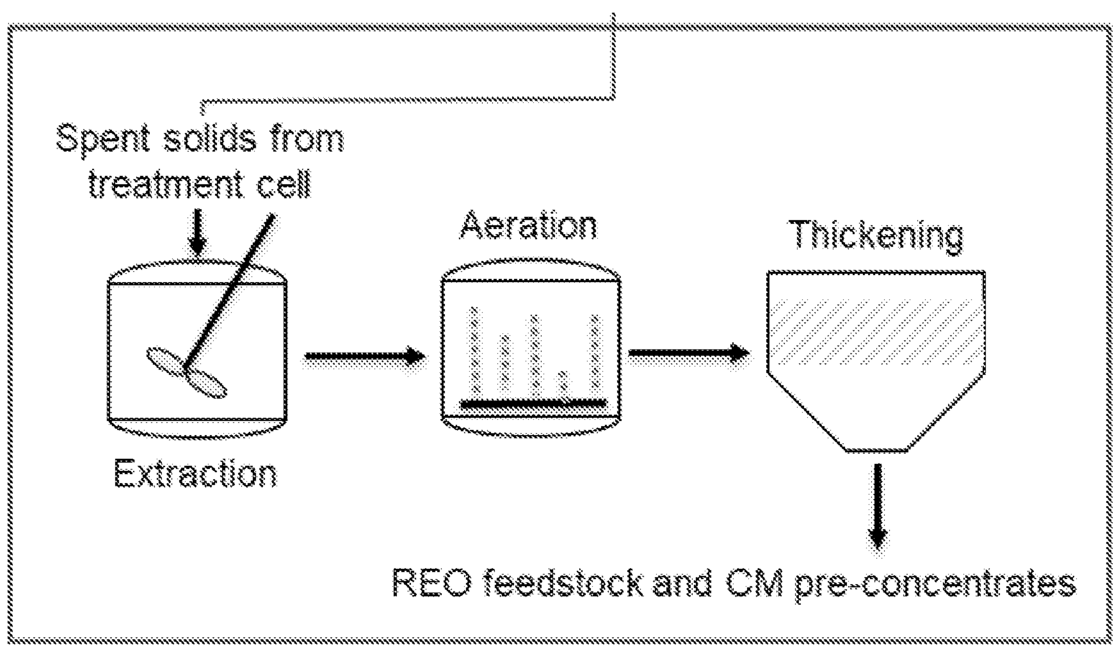

The concept of an AML reclamation approach that implements the TEP process is illustrated in FIG. 1A-1D. sFGD (fresh or landfilled), WTP sludge, or other environmentally benign alkaline industrial by-product is used to backfill and reclaim the AML (FIG. 1A). With proper engineering design, CMD seeping out of the abandoned mine can be collected by a drainage system and directed to nearby treatment cells (FIG. 1B). These remediation cells are also filled with alkaline materials and are equipped with a dispensing system (e.g., geotextile material) to facilitate the percolation of CMD, and consequently accelerate the mitigation process (FIG. 1C). After the material exhausts its neutralization capacity, the spent solids can be removed from the treatment cells for the following extraction and precipitation processes (FIG. 1D). The operation can be continued by simply placing another batch of alkaline material in the treatment cells.

Scope of Investigation

The investigation is organized into four phases. In the first phase, we carried out field investigations aimed at screening and establishing the distributions and temporal profiles of rare earths for AMD discharges that have high recovery potential. Next, laboratory-scale studies were carried out to (1) validate the effectiveness and feasibility of recovering rare earths using sFGD; (2) evaluate the associated change of AMD hydrochemical property; (3) identify the forms of retained rare earths to understand the mechanisms controlling the recovery process, and (4) maximize the rare earth recovery system. In Phase III, a highly selective extraction procedure was tested to concentrate the concentration of total rare earths (T-REEe) to above 2 wt. %. In the final phase, techno-economic analysis and life-cycle assessment was be carried out to help evaluate the economic and environmental benefits. This will also aid in identifying potential testing sites for next-phase pilot scale studies.

Field Investigation

Selecting AMD Discharges. 35 AMD discharges were selected for the field investigation. The selection criteria include pH, acidity, discharge rate, impact priority on watershed, representing coalfield, and geographic location with respect to sFGD source Screening for Rare Earth Recovery Potential. Water samples collected from the 35 selected AMD discharges were analyzed for rare earths and other constituents. During sampling, field data, such as flow rate, temperature, specific conductance, dissolved oxygen, and redox potential were measured. Samples were collected in accordance with standard methods. Both total and dissolved elemental compositions were analyzed.

Establishing temporal profiles of rare earths for at least three AMD discharges. Three AMD discharges that have the highest rare earth recovery potentials were selected for long-term monitoring. Quarter water samples were collected to establish temporal profiles.

Integrating rare earth data into Geographic Information System (GIS) database. These results were integrated into the GIS data files. The GIS data contain (1) abandoned mined land inventory, (2) Ohio Geological Survey abandoned underground mine records, (3) AMD streams and watersheds in Ohio, and (4) coal-fired power generation facility inventory. Using GIS software and the data files, the potential sites that have high rare earth recovery potential were identified.

Maximizing Retention of REEs

Collecting AMD and sFGD Samples. The source water used in this study was periodically collected from the Flint Run, a perennial AMD stream from the seepage discharge of a reclaimed surface mine. AMD was preserved in a refrigerator at 4° C. before use. During each column test, AMD was continuously purged with nitrogen to minimize oxidation. AMD influents were collected periodically to monitor the water quality change The alkaline by-products used to retain AMD REEs include two sFGD and a lime sludge produced from the softening process at a drinking water treatment plant. sFGD is a mixture of lime (CaO), coal ash, and calcium sulfite FGD by-product, which is produced from the wet scrubber for removing sulfur dioxide ($SO_2$) from the coal flue gas. The sFGD materials were collected from Plants C and G, pulverized-coal power generating facilities burning bituminous coal. The wet scrubbers at Plant C used limestone slurry as the reagent. Lime slurry were used at Plant G and magnesium hydroxide was used to enhance the $SO_2$ removal efficiency. Both wet scrubber systems are natural oxidation systems. The materials were dried in an oven at 60° C. before being crushed and sieved using No. 60 shieve.

Retaining REEs

Column Test. A series of column tests were carried out to simulate the percolation condition that occurs when using a passive treatment unit for AMD mitigation and REE recovery. For a given column test, a vertical acrylic vessel with an inner diameter of ca. 5.0 cm and length of ca. 27.8 cm was filled with known amount of a by-product (sFGD). The mass was sandwiched between two layers of sand with approximately 2 cm in total thickness. The sand, which was used to evenly distribute the incoming AMD and homogenize effluent, was soaked in a 2% nitric acid solution overnight and rinsed thoroughly with DI water before use.

For a given test, AMD was first introduced into the column from the bottom using a peristaltic pump (FH100M of Thermo Fisher Scientific) until the column packing was completely wetted. The pump was stopped when the eluent level in the column was even with the top of the column. After allowing AMD sit in the column and equilibrate with the material for approximately 24 hours, the operation of pump began, which allowed AMD to flush trough the column at a pre-determined rate. Eluents with varying volumes were collected throughout the testing period. The testing conditions of each test are summarized in Table 1.

TABLE 1

Experimental Matrix of Column Test.

| Testing Series | Percolation Rate (L/S ratio/day) | Solid Material | Final Cumulative L/S Ratio |
|---|---|---|---|
| Col.-B | 0.52 ± 0.14 | sFGD 1 | 28.4 |
| Col.-C | 1.8 ± 0.3 | sFGD 1 | 47.8 |
| Col.-D | 1.0 ± 0.4 | sFGD 1 | 50.8 |
| Col.-E | 1.2 ± 0.5 | DRWP | 74.3 |
| Col.-F | 1.0 ± 0.3 | sFGD 3 | 57.5 |
| Col.-G | 1.9 ± 0.2 | sFGD 3 | 66.1 |
| Col.-I | 1.3 ± 0.6 | DRWP | 122.2 |
| Col.-J | 1.6 ± 1.2 | DRWP | 153.3 |

sFGD1 material was collected from American Electric Power's (AEP) Conesville Five-Point Phase III-East Reclamation Site near Coshocton, Ohio, where sFGD1 was used as the backfilling material in the reclamation of an abandoned mine land (AML). DWRP is lime sludge obtained from a water treatment plant. sFGD3 is an alternative stabilized flue gas desulfurization material from a different source.

Each collected eluent was filtered with a 0.45-μm filter (HAWP04700 MF, Millipore, Germany) and divided into two sub-samples. The first sub-sample was preserved with 2% nitric acid and analyzed for metals and metalloids, including REEs. The second sub-sample was analyzed for alkalinity, acidity, sulfate, and chloride.

Batch Test. The retention of REEs was also investigated by a series of batch experiments, which simulated the retention of REEs under a completely mixed condition. These tests were carried out by adding predetermined amounts of sFGD 1 or WTP sludge to bottles which contained AMD to achieve liquid-to-solid (L/S) ratios that ranged from 5 to 1000 (Table 2). The solid/AMD solutions were then equilibrated end-over-end at a rate of 30 rpm for 24 hours. All of the collected samples were prepared and analyzed per the same procedures described in the aforementioned percolation column test.

TABLE 2

Experimental Matrix of Batch Test.

| Testing Series | Solid Material | Weight of Solid (g) | Volume of AMD (mL) | Final L/S Ratio |
|---|---|---|---|---|
| Batch-A | sFGD 1 | 80.3000 | 401.50 | 5.00 |
| Batch-B | sFGD 1 | 40.8000 | 408.00 | 10.00 |
| Batch-C | sFGD 1 | 10.4220 | 410.55 | 39.39 |
| Batch-D | sFGD 1 | 10.1000 | 404.00 | 40.00 |
| Batch-E | sFGD 1 | 8.1524 | 406.20 | 49.83 |
| Batch-F | DRWP | 20.0285 | 2000.0 | 100 |
| Batch-G | DRWP | 8.0004 | 2000.0 | 250 |
| Batch-H | DRWP | 4.008 | 2000.0 | 500 |
| Batch-I | DRWP | 2.6672 | 2000.0 | 750 |
| Batch-J | DRWP | 2.0052 | 2000.0 | 1000 |
| Batch-K | DRWP | 20.0285 | 2000.0 | 250 |
| Batch-L | DRWP | 8.0030 | 2000.0 | 250 |
| Batch-M | DRWP | 8.0059 | 2000.0 | 275 |
| Batch-N | DRWP | 7.2767 | 2000.0 | 300 |
| Batch-O | DRWP | 6.6630 | 2000.0 | 350 |
| Batch-P | DRWP | 5.7127 | 2000.0 | 450 |

sFGD1 material collected from American Electric Power's (AEP) Conesville Five-Point Phase III-East Reclamation Site near Coshocton, Ohio, where sFGD1 was used as the backfilling material in the reclamation of an abandoned mine land (AML). DWRP is lime sludge obtained from a water treatment plant.

Identifying Mechanisms Controlling Retention of REEs

Predicting aqueous species using geochemical modeling. A speciation-solubility computer code can be used to carry out the geochemical model. The potential aqueous species of REEs in the AMD tested was calculated using a database.

Mineral and elemental composition analysis. The mineral compositions of both un-reacted and spent sFGDs can be analyzed using an X-ray powder diffractometer employing a CuKa radiation at 40 kV and 15 mA. Step-scanned data can be collected from 6 to 66° 2Θ with a fixed time. Data can be analyzed using a data reduction software. The complete elemental composition of both unreacted and spent sFGD can be analyzed using microwave-assisted heating methods. This analysis can utilize inductively coupled plasma atomic emission spectroscopy and cold vapor atomic fluorescence spectroscopyusing.

Quantitative Evaluation of Minerals by Scanning Microscopy (QEMSCAN) analysis. In addition to XRD analysis, the spent sFGDs can be analyzed for their mineral content using Quantitative Evaluation of Minerals by Scanning Microscopy (QEMSCAN). A Field Emission Gun SEM equipped with an analytical system of wavelength dispersive spectroscopy can be used. In addition, a synchrotron-based μ-ray fluorescence (μXRF) analysis can be used to identify the mineral forms of retained rare earths.

Concentrating Retained REEs

Extraction. The spent solids obtained from the column and batch tests were air dried before extraction. The extraction of REEs followed a citrate-bicarbonate-dithionite (CBD) method. Briefly, the spent solids was mixed with 0.3 M sodium citrate at predetermine ratios ranging from 1:10 to 1:40. The mixture was then heated in a hot block at 80° C. Sodium dithionite was then added to the suspension. After heating for 15 minutes, the extract was separated from the suspension and collected for chemical analysis. The extraction residue was then air dried for chemical analysis.

The extraction procedure was tested under various conditions, i.e., dosage, pH buffering, and liquid-to-solid ratio. The testing matrix is shown in Table 3.

TABLE 3

Experimental Matrix for Extraction.

| | Spent Solids | | Extractant | | | |
|---|---|---|---|---|---|---|
| Extraction Test | material | Amount (g) | Total Volume (mL) | Sodium dithionite (g) | 0.3M Sodium Citrate (mL) | 1M Sodium Bicarbonate (mL) |
| E-1 | Col. B-L1 | 1 | 45 | 3 | 40 | 5 |
| E-2 | Col. B-L1 | 1 | 45 | 2 | 40 | 5 |
| E-3 | Col. B-L1 | 1 | 45 | 1 | 40 | 5 |
| E-4 | Col. B-L1 | 1 | 35 | 3 | 30 | 5 |
| E-5 | Col. B-L1 | 1 | 25 | 3 | 20 | 5 |
| E-6 | Col. B-L1 | 1 | 25 | 3 | 10 | 5 |
| E-7 | Col. B-L1 | 1 | 40 | 3 | 40 | 0 |
| E-8 | DRWP-L1 | 1 | 45 | 3 | 40 | 5 |
| E-9 | DRWP-L1 | 4 | 40 | 3 | 40 | 0 |
| E-10 | DRWP-L1 | 4 | 40 | 0 | 40 | 0 |
| E-11 | DRWP-L1 | 4 | 40 | 1.5 | 40 | 0 |
| E-12 | DRWP-L1 | 1 | 40 | 3 | 40 | 0 |
| E-13 | DRWP-L1 | 2 | 40 | 3 | 40 | 0 |
| E-14 | DRWP-L1 | 4 | 40 | 3 | 40 | 0 |

Precipitation. After extraction, the REEs were separated from the extraction solution by promoting the formation of Na-REE-double sulfate precipitates (REE concentrate). In this aeration step, the dithionite added previously was converted to sulfate by purging the extract with air or pure oxygen, which helps the dithionite→sulfate conversion (eqs. 1 and 2). REEs then react with Na and sulfate, and form Na-REE-double sulfate precipitates (eq. 3). The formation of precipitates during the aeration step.

$$S_2O_4^{-2}+O_2+2OH^- \rightarrow SO_3^{-2}+SO_4^{-2}+H_2O \quad \text{(eq. 1)}$$

$$SO_3^{-2}+\tfrac{1}{2}O_2 \rightarrow SO_4^{-2}+H_2O \quad \text{(eq. 2)}$$

$$REE^{+3}+2SO_4^{-2}+Na^{+}+nH_2O \rightarrow NaREE(SO_4)_2.nH_2O \quad \text{(eq. 3)}$$

Techno-Economic Analysis and Life-Cycle Assessment

Techno-economic and life-cycle assessment principles can be applied to the detailed understanding of full-scale applications of this proposed approach. The engineering-economic costs and net energy, net $CO_2$ emissions, and water and other requirements can be investigated to understand the economic and environmental implications of this approach to recover REE from CMD and the benefits of combining with CMD mitigation as an integrated AML reclamation approach.

There are at least three beneficial aspects of this proposed CMD REE recovery process that will be investigated under this task, with specific attention to what is required, what is produced, and what is avoided. For example, this process avoids the disposal of FGD material in landfills. This handling, transportation, and disposal requires inputs (e.g., energy) and the net balance of these inputs will be determined along with their economic costs. Similarly, using AMD avoids using inputs to mitigate its discharge into receiving water bodies or mitigating the effects once it is in one of those water bodies. Most importantly, this process uses wastes as feedstock and low-cost, environmental friendly reagents to covert coal combustion by-products into valuable materials that can be further to be purified for REE production. The existing approaches for reclaiming AML and mitigating AMD may not be as necessary given the industrial-scale application of this proposed integrated approach.

While it may be ideal for the sFGD, AMD, and AML to be co-located, it is unlikely that there are a large number of opportunities where all of these inputs will be readily available at the same location. As such, work that will be conducted under this task will investigate different combinations of transportation of the inputs and products (e.g., sFGD to AML where there is AMD, transportation of sFGD to AML where there is AMD). Finally, since this proposed work produce REEs, the analyses above will focus on the what REE prices can make this approach economically viable in and of itself. That is, the marginal cost of REEs as an input will be determined for the various processes and configurations in order to determine the REEs price that renders them profitable in and of themselves.

Propose Potential Site for Next-Phase Study

Progress from this proposed project will be shared and discussed with stakeholders (e.g., coal combustion power generation facility, AML landowners, and state agencies). At least one potential site that is suitable for carrying out a pilot-scale study of this proposed integrated approach will be proposed.

Field Investigations

Water samples from 25 AMD discharges were collected and analyzed for REE concentrations and other hydrochemical characteristics. For a given site, samples were collected in accordance with the standard methods described above.

Figure 2:
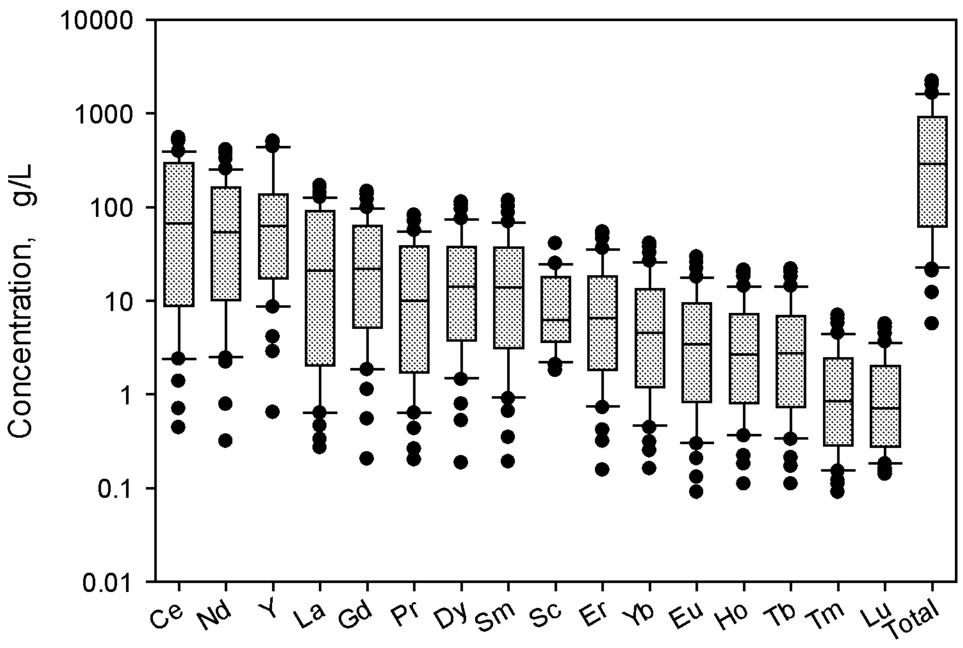
FIG. 2 is a plot showing the concentration of rare earth elements in 25 AMD discharges.
Figure 3:
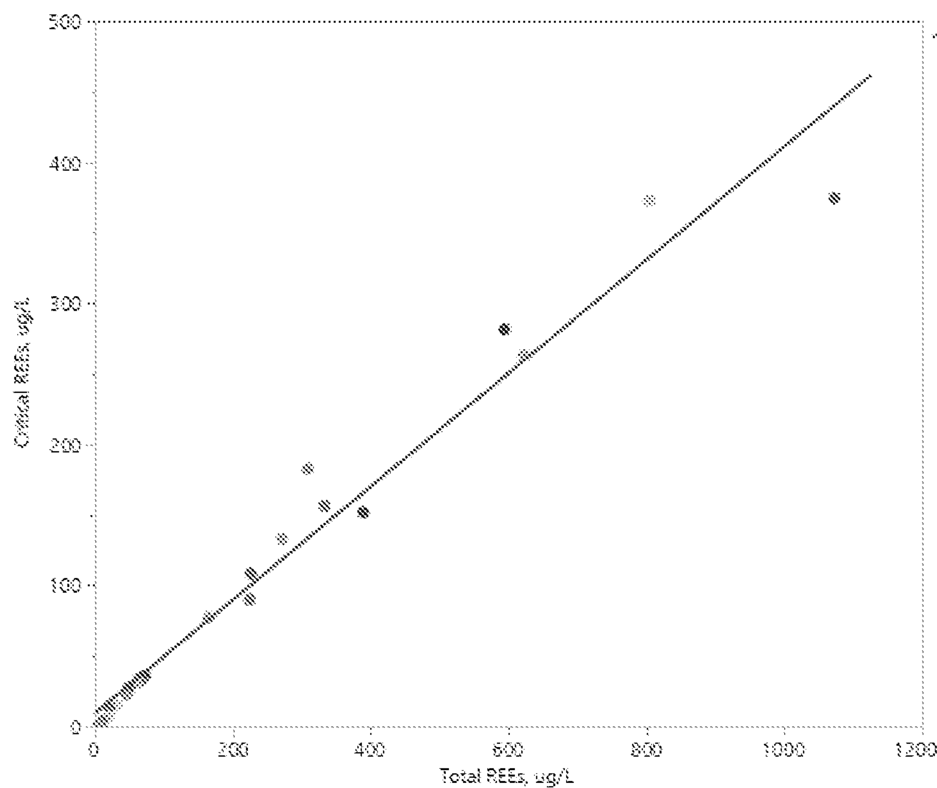
FIG. 3 is a plot showing the correlation between the total concentration of REEs and the concentration of critical REEs in 25 AMD discharges.

Concentrations of REEs and Other Constituents in AMDs. The concentration of T-REEs varies significantly among the 25 AMD discharges, ranging from 1073 to 5 μg/L (FIG. 2). As shown in the figure, in general, Ce, Nd, and Y are the most abundant REEs in AMD. Critical REEs (i.e., Y, Dy, Eu, Dy, and Tb) account for approximately 40% of total REEs. There is a strong correlation between the concentrations of total and critical REEs (FIG. 3), with a correlation coefficient (r) of 0.987.

Figure 4:
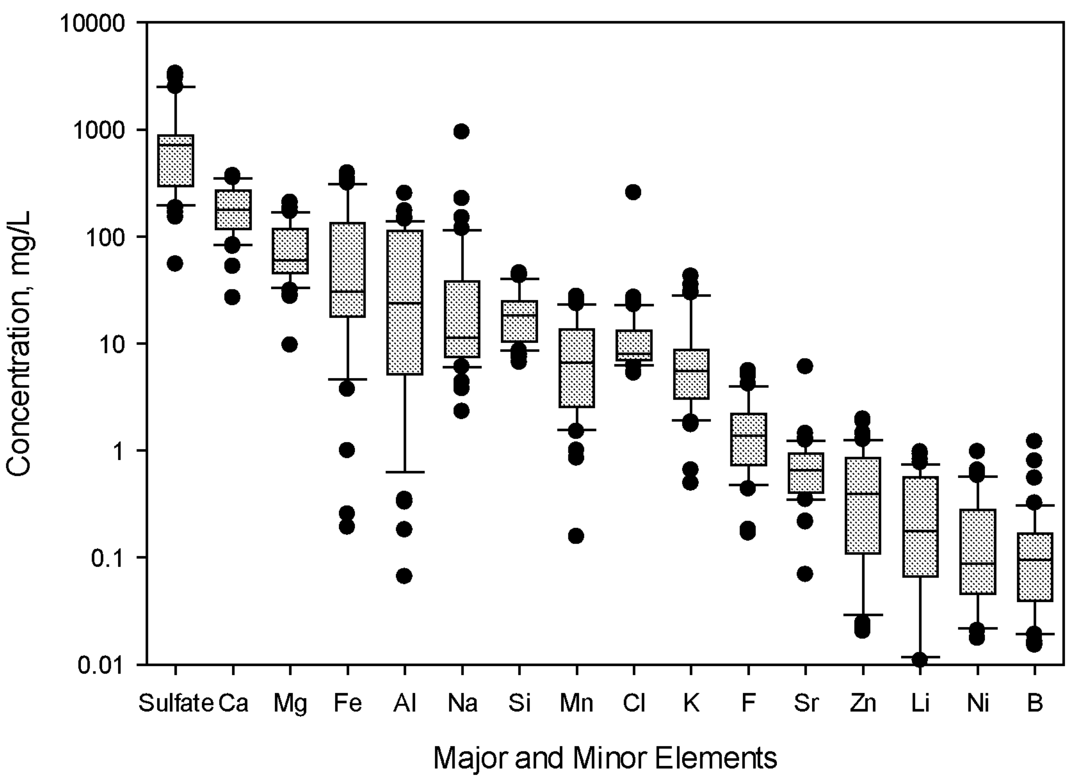
FIG. 4 is a plot showing the concentration of major and minor elements in 25 AMD discharges.
Figure 5:
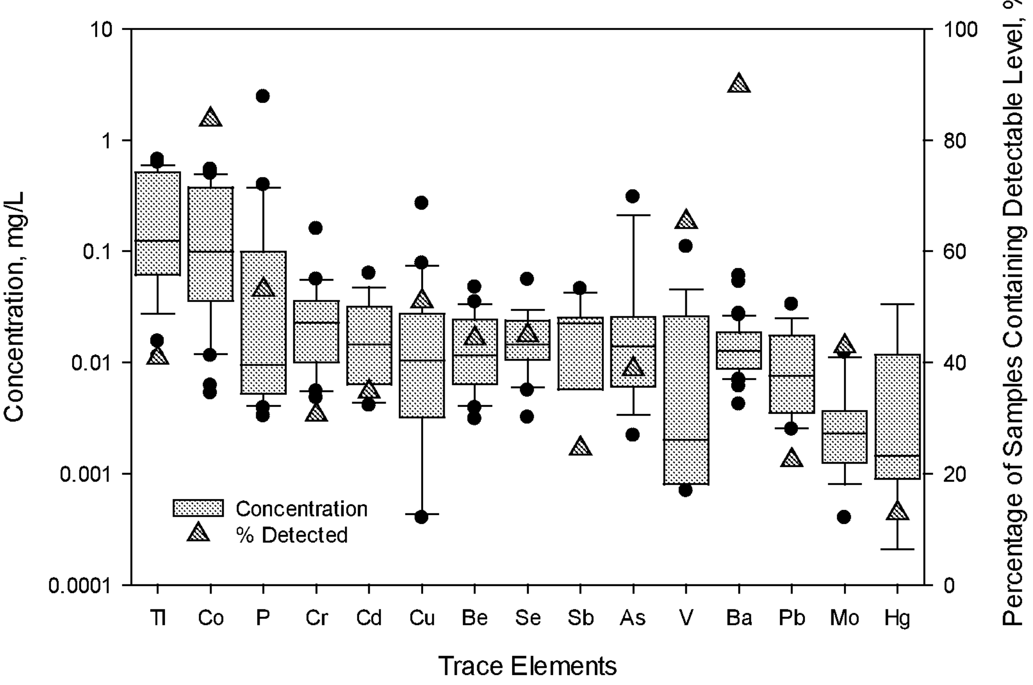
FIG. 5 is a plot showing the concentration of trace elements in 25 AMD discharges. The percentage of samples with non-detectable concentration level for each trace element is shown as a triangle.

The concentrations of major/minor and trace elements in the AMD samples are shown in FIG. 4 and FIG. 5, respectively. All water samples are highly mineralized with TDS concentration ranging from 247 to 7364 mg/L. The pH value ranged from acidic (2.3) to circumneutral (6.89). The major ions in the CMD samples include $SO_4^{-2}$, Ca, Mg, Fe, Al, Na, Si, Mn, Cl, and K. By comparing the relative concentration of major cations (Ca, Mg, Na, and K) and anions ($SO_4^{-2}$, $Cl.HCO_3^{-}$, and $CO_3^{-2}$) in the AMD samples using a piper diagram, the water types were Ca—$SO_4$ and Mg—$SO_4$. Many trace elements were also detected in some of the AMD samples. The concentration levels of detectable Tl and Co ranged from approximately 0.01 to 1 mg/L. However, not all of the samples contain detectable levels of trace elements. Only 10 (40%) and 21 (84%) of total 25 samples showed detectable Tl and Co, respectively. Ag was only detected in one of the samples (0.0007 mg/L), and therefore, it is not included in FIG. 5.

Figure 6:
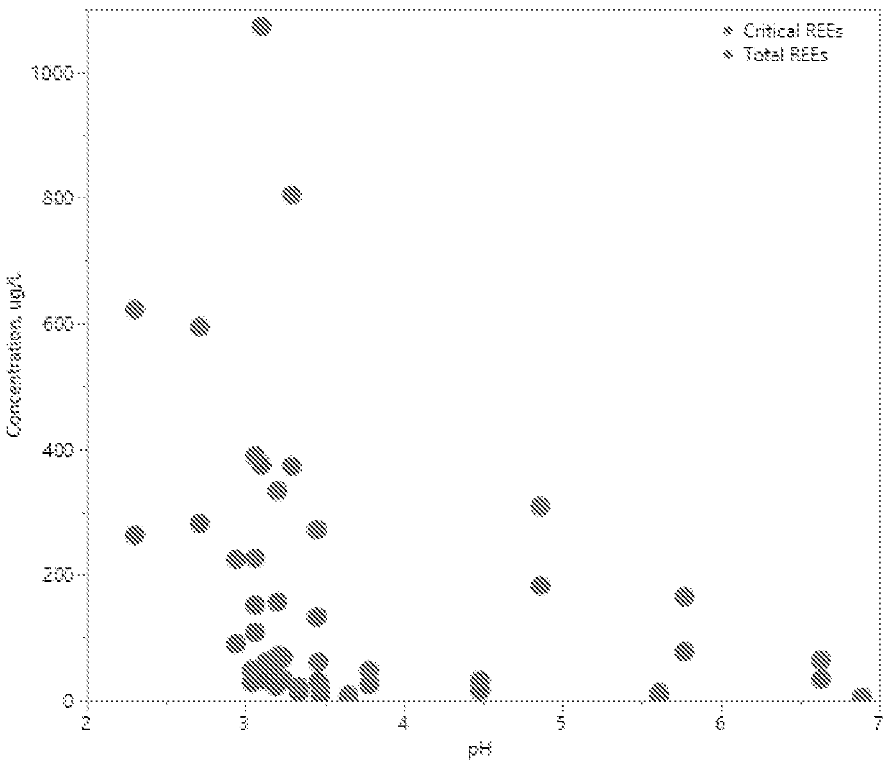
FIG. 6 is a plot showing the correlation between pH and concentration of total and critical REEs.

Hydrogeochemical Property of REEs. It has been reported that the concentrations of REEs in AMD is strongly correlated with pH. As shown in FIG. 6, the pH values of the four AMD discharges with the highest total and critical REEs concentrations are all less than 3.5. However, not all AMD discharges with low pH values contain high REE concentrations. No significant correlation between the pH and concentration of either total (r=−0.366) or critical REEs (r=−0.360) was observed.

To further correlate T-REEs and hydrochemical parameters, as well as other constituents, a principal component analysis (PCA) was used to examine the majority of the variances among the leachates with different pHs. PCA, a statistical technique for data reduction, was used to extract information from a large number of multivariate data sets. It was hypothesized that the concentrations of REEs and some constituents might follow similar patterns among these AMD samples, and therefore, represent similar hydrogeochemical property. PCA quantifies the relationship among constituents/parameters, and finds a new independent coordinate system of uncorrelated variables to represent original data. Each coordinate direction is expressed as a linear combination of the original variables.

Figure 7:
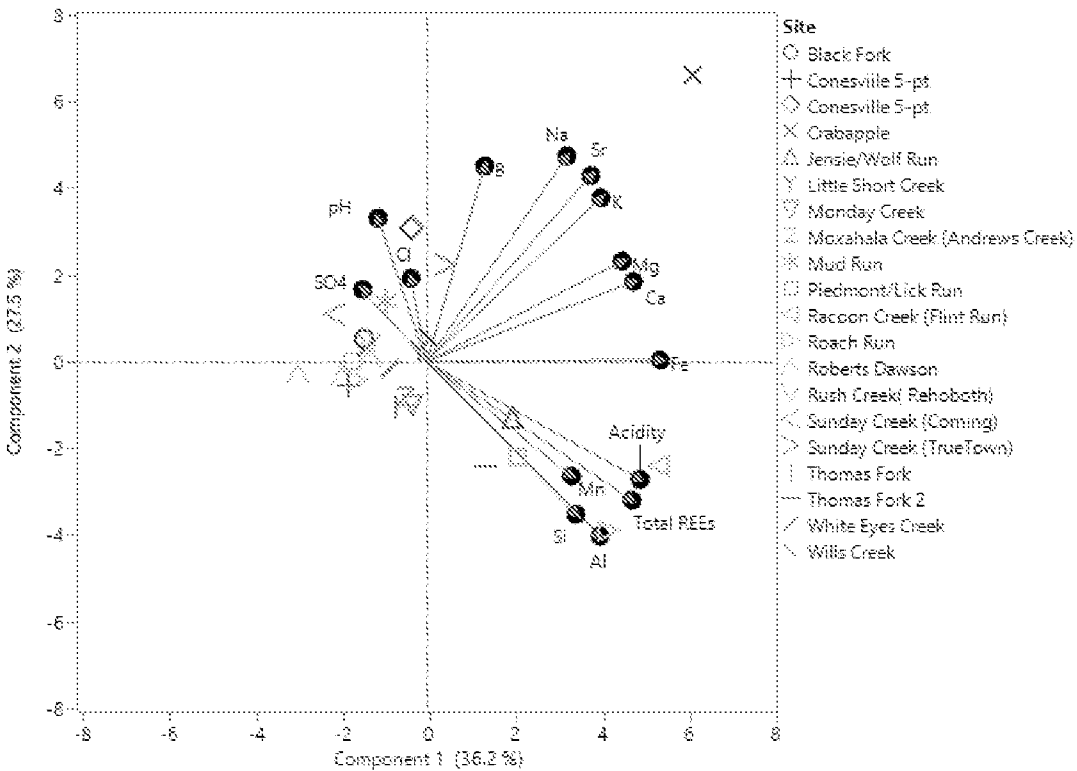
FIG. 7 is a plot showing the score and loading plots of PCA results.

It was found that the loadings of the two most significant principal components (PCs), describing 63.7% of the concentration variations of the 25 AMD discharge samples (FIG. 7). As shown in FIG. 7, the total-REEs is clustered with acidity, Mn, Al, and Si in the fourth quadrant, suggesting the concentration of total REEs in AMD is highly correlated with these parameters/constituents. The four AMD discharges that have the highest total REE concentration, i.e., Flint Run, Lick Run, Rough Run, and Wolf Run, all had high acidity, Al, Mn, and Si.

Figure 8:
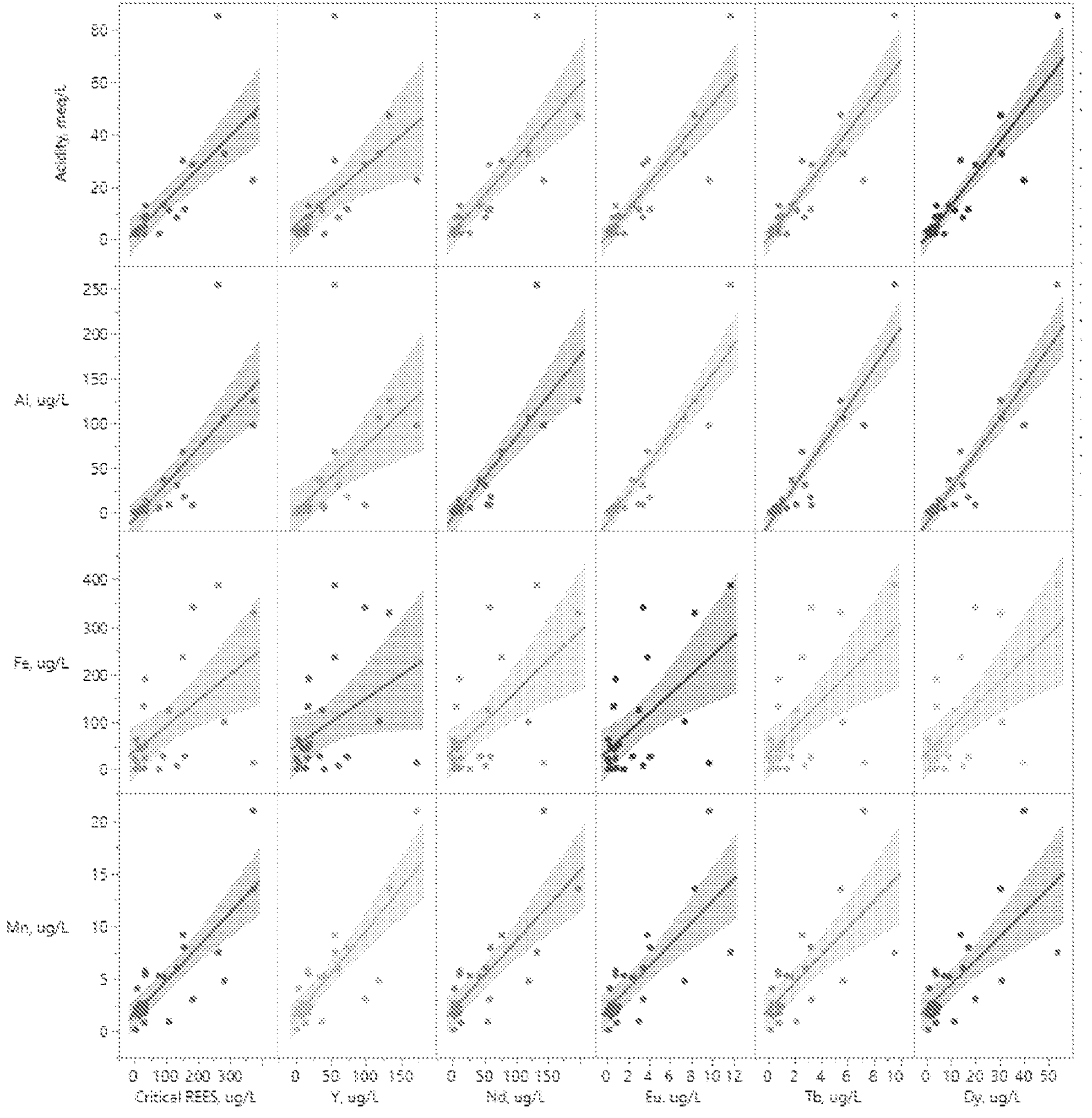
FIG. 8 includes plots shoring the correlations between acidity, as well as acidity-causing transition metals, and critical REEs.

The presences of critical REEs correlate better with the acidity (r=−749) of the AMD discharge, as well as the concentrations of acidity-causing transition metals, especially Al (r=0.773) and Mn. (r=0.809) (FIG. 8). Among the five critical REEs, Mn has the strongest correlation with Y. Compared to Mn, Dy, Nd, Eu, and Tb correlate better with Al.

Figure 9A:
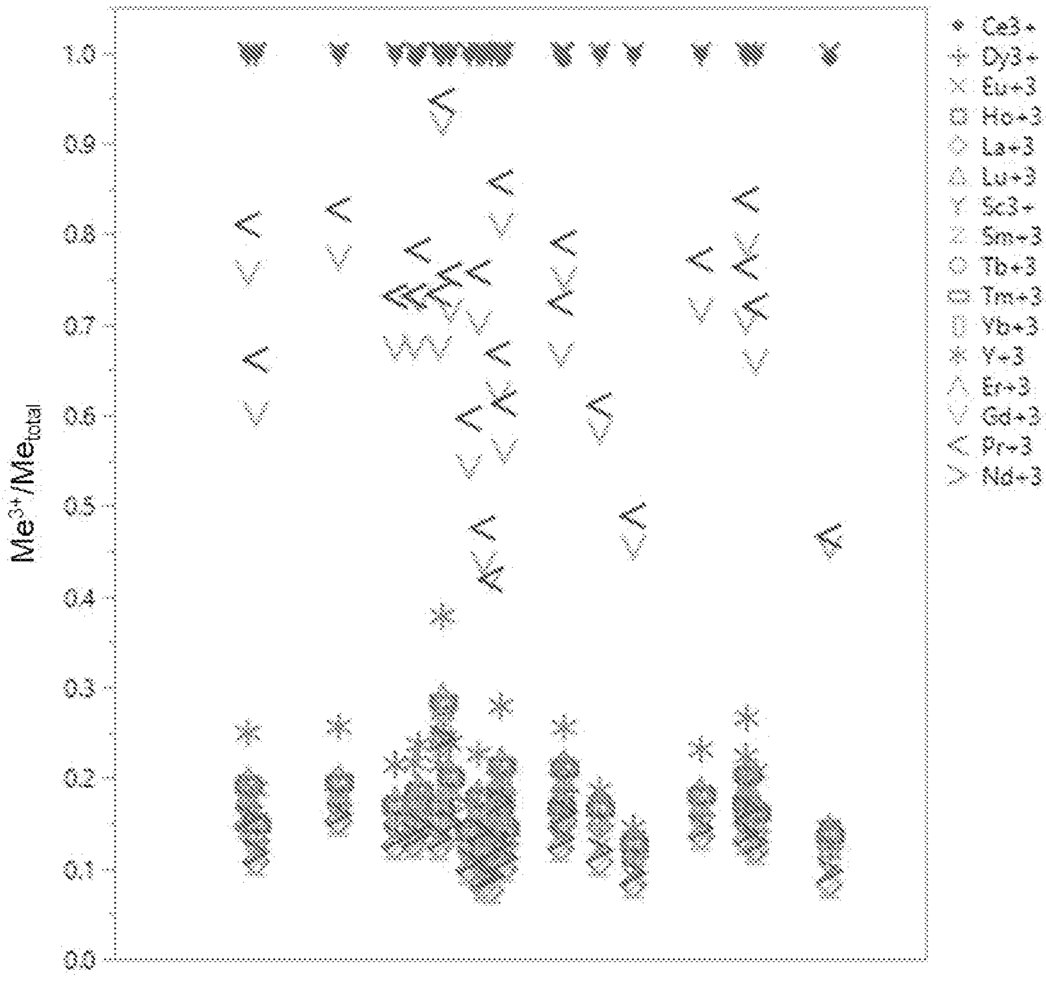
FIGS. 9A-9C are plots illustrating the fractions of the three most dominate aqueous species, i.e., trivalent ion (FIG. 9A), mono-sulfate complex (FIG. 9B), and di-sulfate complex (FIG. 9C), in AMD obtained from PHREEQC geochemical calculations.
Figure 9B:
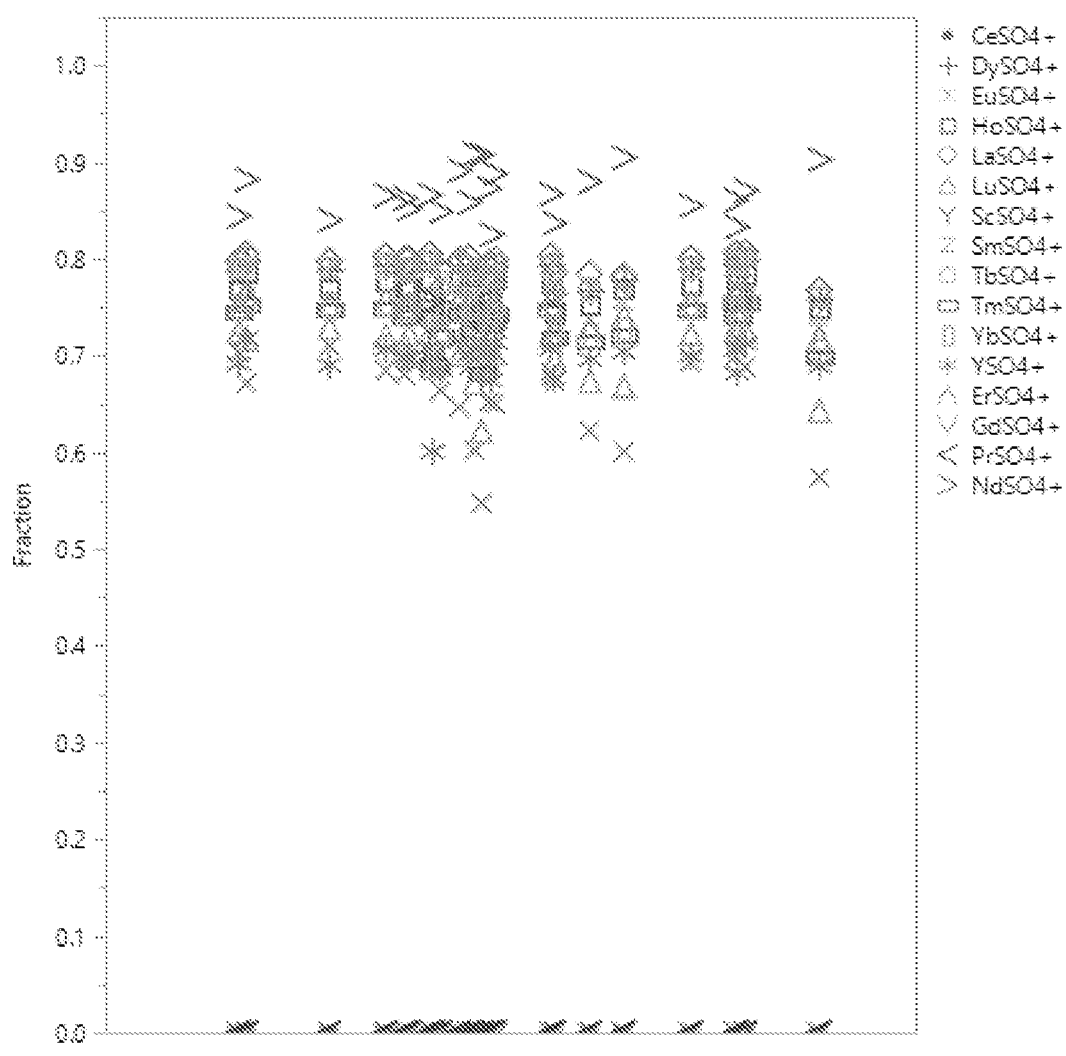
Figure 9C:
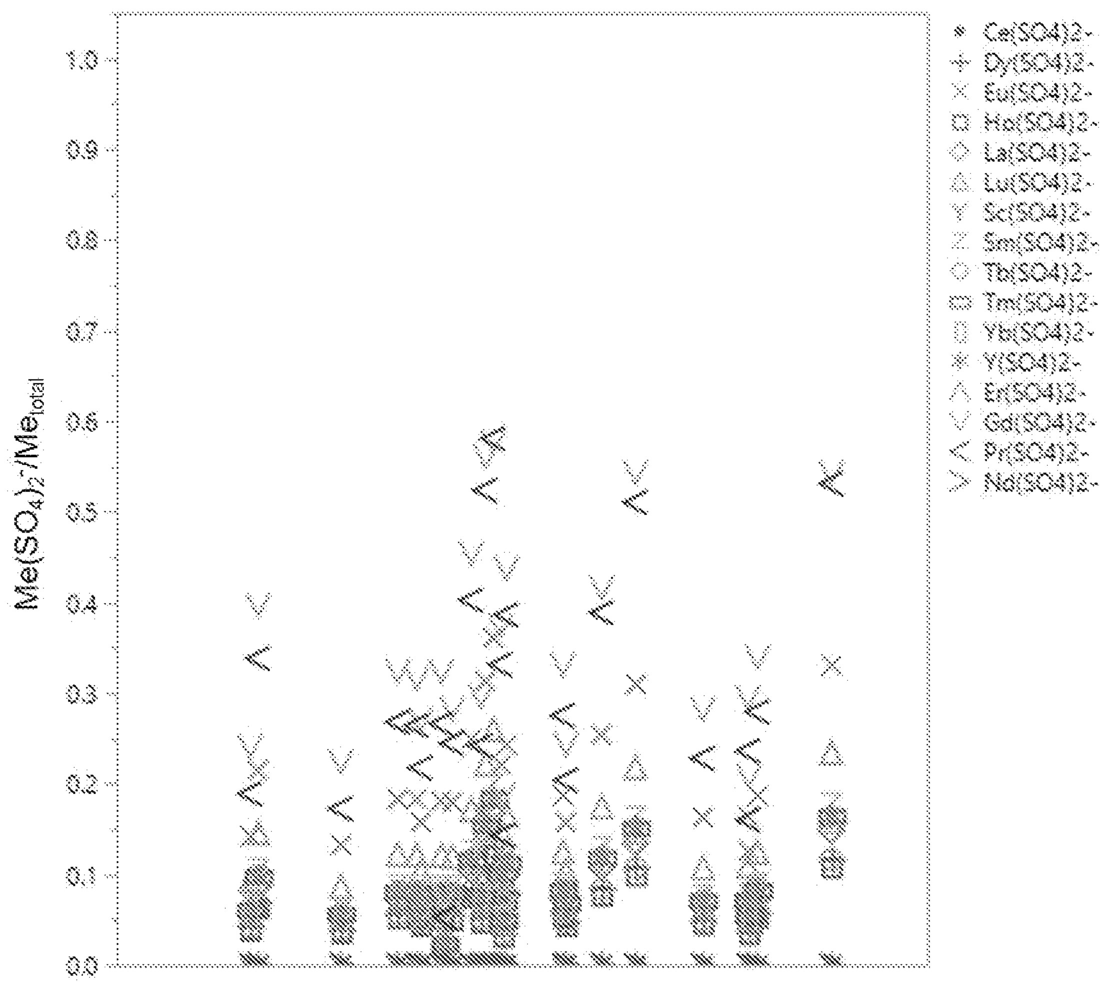

Species of REEs in AMD. The speciation of REEs in AMD were calculated using a computer code PHREEQC version 3.3, provided by the United States Geological Survey (USGS) with the LLNL database. In general, trivalent ions ($Me^{3+}$), monosulfate complexes ($MeSO_4^{+}$), and/or disulfate complexes ($Me(SO_4)^{2-}$) are the most dominant species. For example, for Sc and Ce, $Me^{3+}$ was the most dominant form. Approximately 100% of Sc and Ce exist in AMD as $Sc^{3+}$ and $Ce^{3+}$, respectively. For the rest of REEs, $MeSO_4^{+}$ is the most dominant form, followed by $Me(SO_4)^{2-}$. See FIGS. 9A-9C.

Results of Retention and Recovery of REEs

Recovery of REEs from CMDs Using sFGD Material and WTP Sludge

Under Percolation Condition. Results obtained from the column tests (FIG. 10A) demonstrate that all three tested solids were able to recover over 98% of REEs under a percolation condition before the materials exhausted their neutralization capacities. In Column D, only approximately 90% of REEs passing through the column was retained, which was due to a breakthrough after the material (sFGD 1) exhausted it neutralization capacity. As shown in FIG. 10B, the pH of the effluent (2.47) reached the level of AMD influent at the end of the test. However, no release of retained REEs was observed. Except for Sc, the retention of all REEs reached over 97% (FIG. 10C).

Figure 10A:
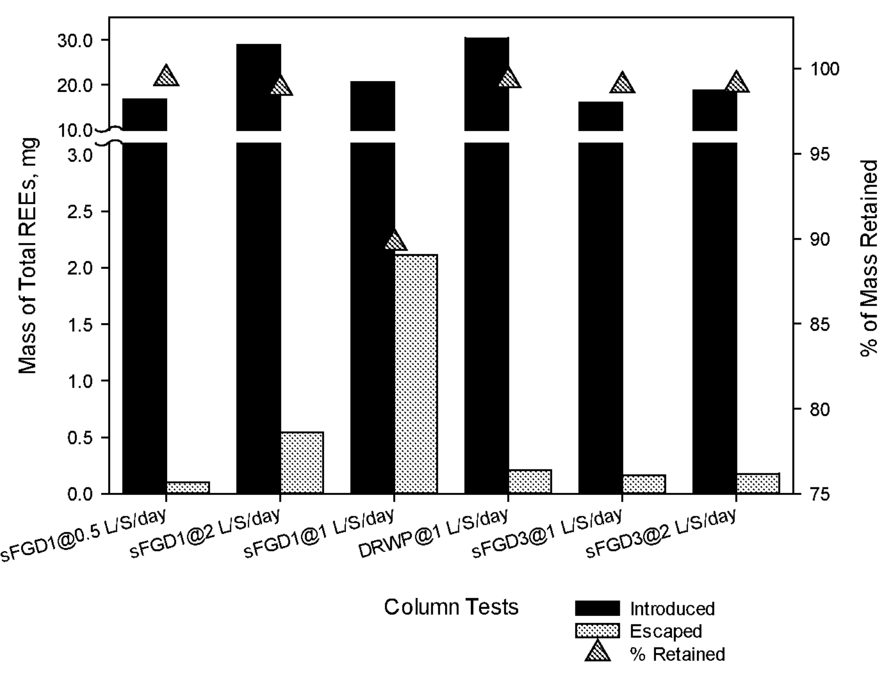
FIGS. 10A-10C illustrate the retention of AMD REEs under percolation conditions.
Figure 10B:
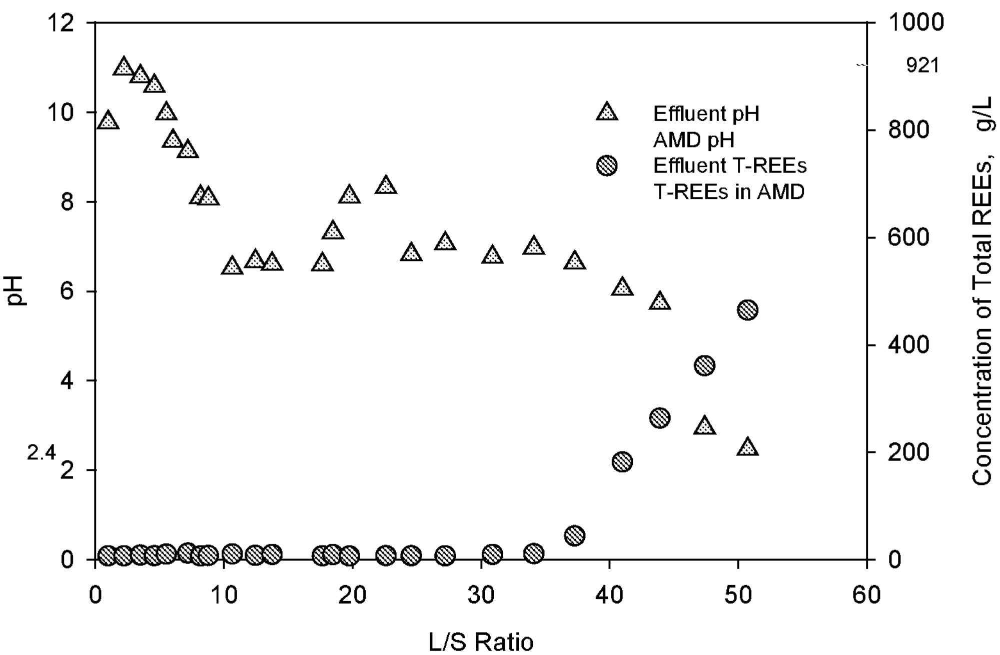
Figure 10C:
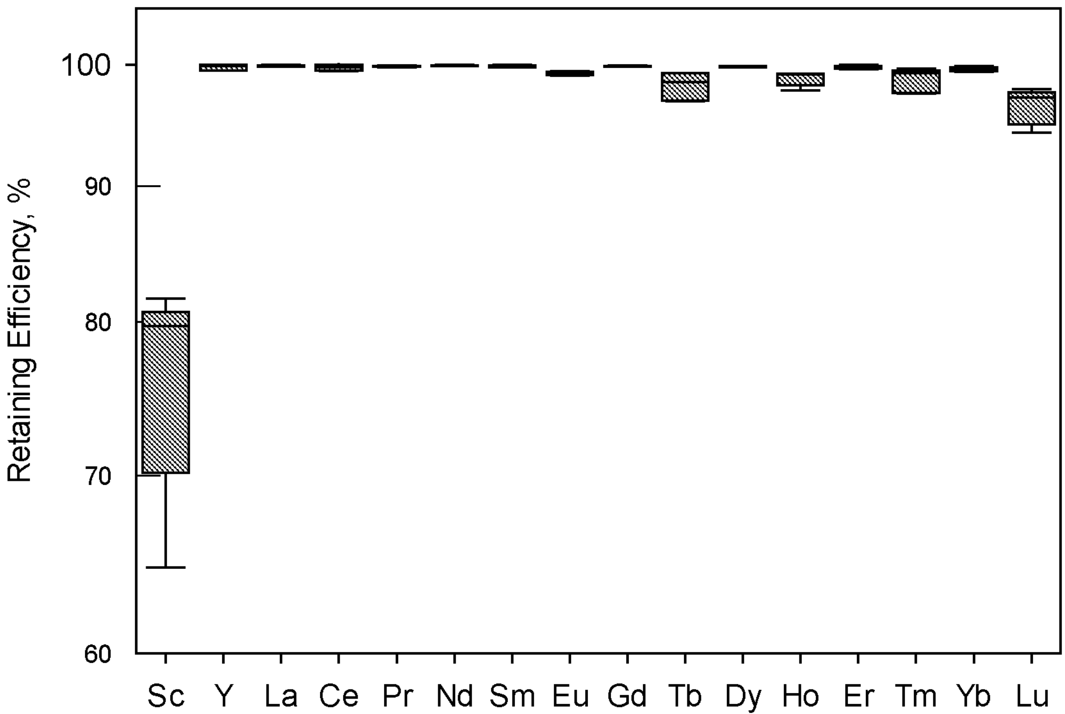

The recovery efficiency shown in FIG. 10A for each column test was calculated using the following equation:

$$\text{Recovery}(\%) = \left(1 - \frac{\sum_i M_{i,escaped}}{\sum_i M_{i,introduced}}\right) \times 100\% = \left(1 - \frac{\sum_{i,j} C_{eff,i,j} \times V_{j,eff}}{\sum_i C_{AMD,i} \times V_{total}}\right) \times 100\% \quad \text{(eq.4)}$$

where, respectively, $M_{i,introduced}$ and $M_{i,escaped}$ are the cumulative masses of a given REE, that were introduced into and escaped from the column during each test. $C_{eff,i,j}$ is the concentration of REE i in the effluent collected during the j time interval. $V_{j,eff}$ is the volume of effluent collected during the j time interval. $C_{AMD,i}$ is the concentration of REE in AMD. $V_{total}$ is the total volume of AMD introduced into the column by the peristaltic pump. Non-detects were replaced by one-half respective detection limits.

For a given column, after the test was completed, the spent solids were carefully removed from the column starting from the inlet end and evenly divided into different drying pans. Therefore, the first pan collected the solids extracted from the inlet layer (Layer 1) of the column, and sequentially, the solids from the outlet layer were collected in the last pan. The spent solids were then dried before being analyzed for chemical composition (including REEs). The distribution of retained REEs in the column can, therefore, be examined.

Figure 11:
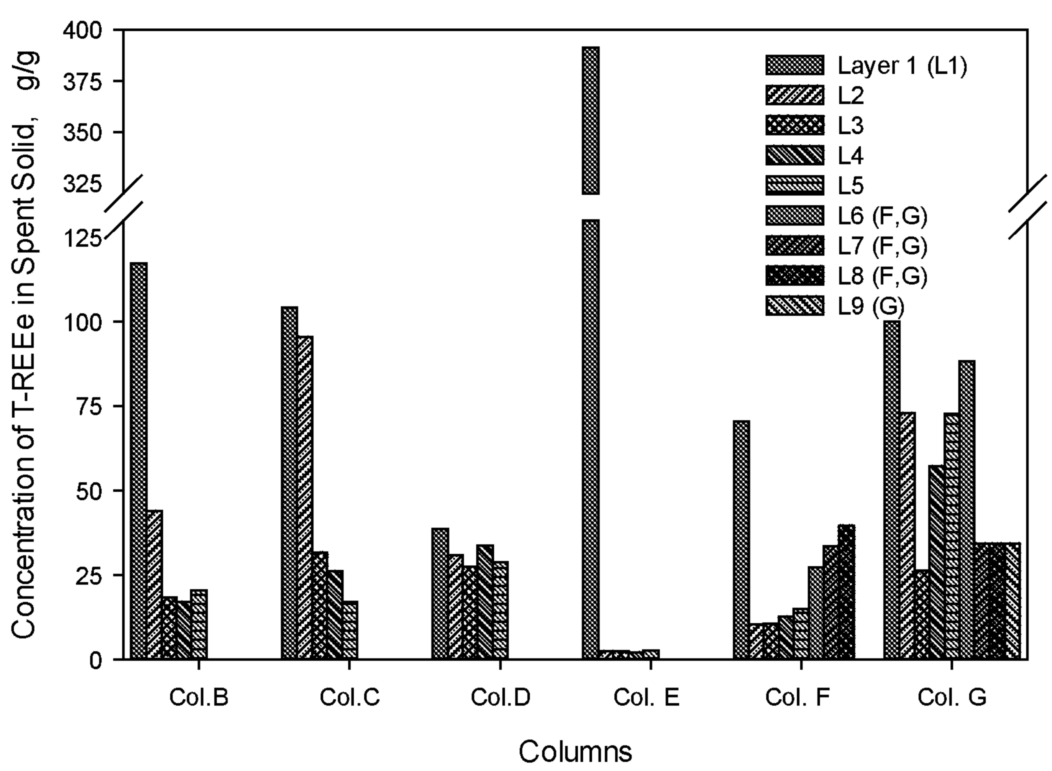
FIG. 11 is a plot showing the distribution of T-REEe within different layers in the spent solid.
Figure 12:
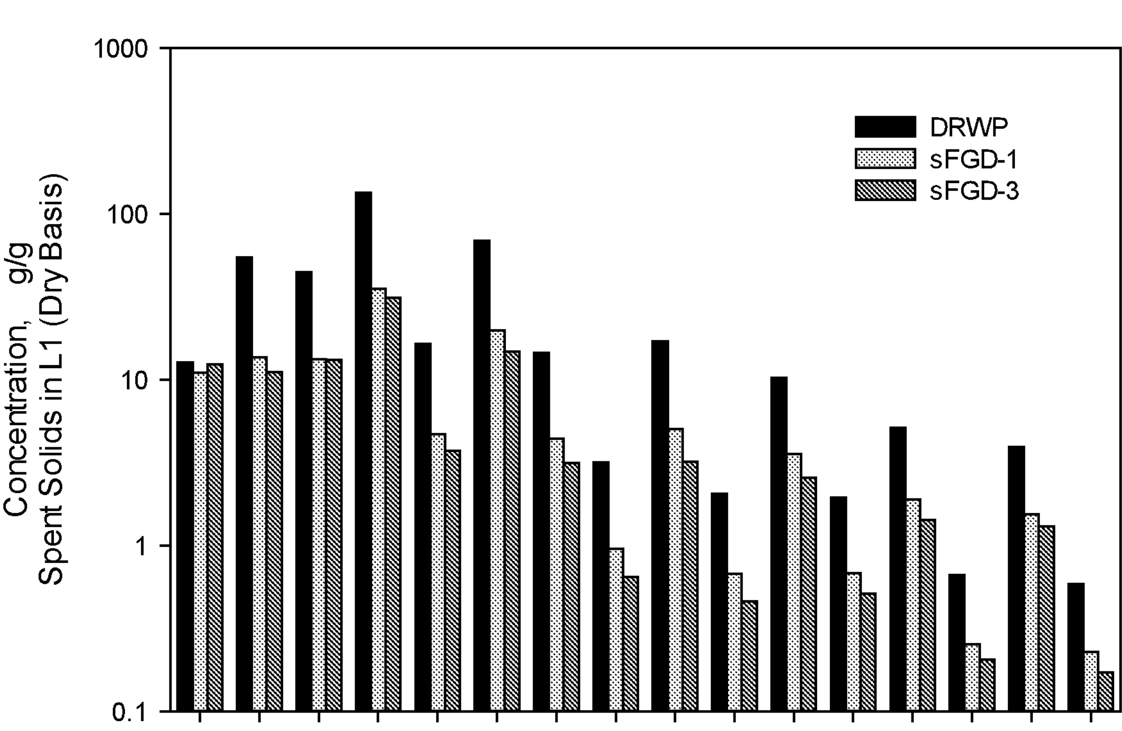
FIG. 12 is a plot showing the concentration of individual REE in spent solids collected from Layer 1 of three selected columns (B, E, and G).

The concentrations of REEs in each layer collected from the six columns are shown in FIG. 11. As shown in FIG. 11, the entrapped REEs in the column are mainly distributed near the inlet of the column. In general, the concentrations of total REEs in the sections close to the inlet are higher than the T-REE concentrations in the sections near the outlet. The observation is more profound in the tests that were stopped before the material exhausted the neutralization capacity. In Column D, where the test was carried out until the material exhausted its neutralization capacity, the entrapped REEs are distributed more evenly along the length of the column. Among the three tested materials, no leakage was found in the column test using DRWP sludge (Column E). The entrapped REEs were only found in the first (entry) of the nine equally divided layers of the column. No detectable REEs was observed in the solids collected from the following layers. The concentration of REEs in the spent DRWP sludge was significantly higher than that in the sFGD spent solid. The highest concentrations of T-REEe are 117.3, 104.2, 38.7, 391.3, 70.5, and 100.1 μg/g in Layer 1 of Columns B, C, D, E, F, and G, respectively. FIG. 12 is a plot showing the concentration of individual REE in spent solids collected from Layer 1 of three selected columns (B, E, and G)

Figure 13:
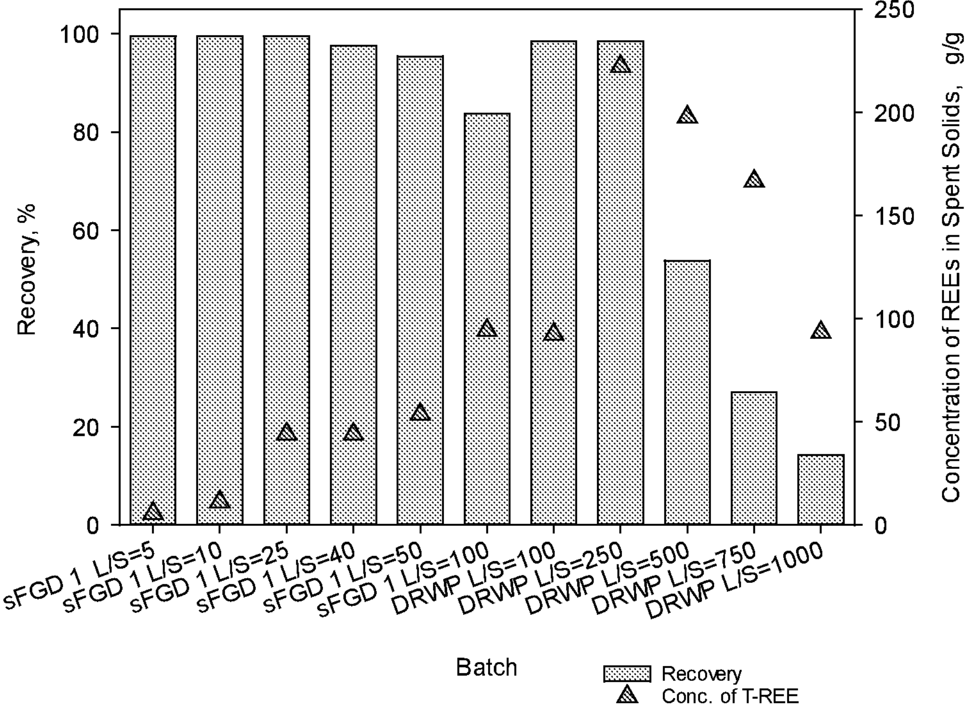
FIG. 13 is a plot showing the retention efficiency and concentrations of REEs in spent solids from batch tests.

Under Completely Mixed Condition. The recovery of CMD REEs was also evaluated under a completely mixed condition. These tests were carried out by adding predetermined amounts of sFGD 1 or WTP sludge (DRWP) to bottles which contained CMD to achieve liquid-to-solid (L/S) ratios that ranged from 5 to 1000. As shown in FIG. 13, when sFGD 1 was used, the retaining efficiency remained above 95% at an L/S ratio 50 or lower. At a higher L/S ratio of 100, although the retaining efficiency decreased to 83.8%, the concentration of total REEs in the spent solids reached 94.2 μg/g (dry basis), which is the highest among the sFGD-1 batches.

In the batches using WTP sludge as the retaining material, over 98% of the total REEs mass in CMD partitioned to the solids under an L/S ratio less than 250. The retaining efficiency decreased under higher L/S ratio. The highest concentration of T-REEe in the spent solid after the reaction reached approximately 230 μg/g. See FIG. 13.

Extracting Entrapped REEs from Spent Solids

Figures 14, 15:
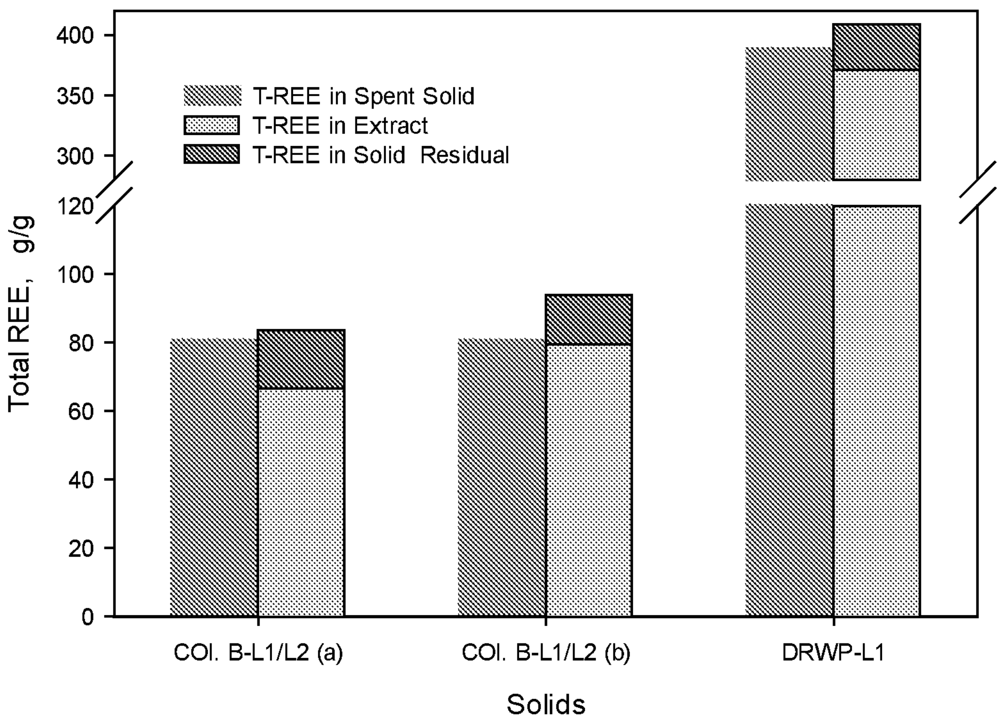
FIG. 14 is a plot showing the retention efficiency and concentrations of REEs in spent solids from batch tests.
FIG. 15 is a plot showing the efficiency of entrapped REEs in Col. B-L1 and Col. E-L1 extracted by different extractant formula. Full strength of sodium dithionite is 3 grams per 1 gram of spent solid. The ratio of spent solid to the volume of extractant ranged from 1/40 to 1/10.
Figure 16A:
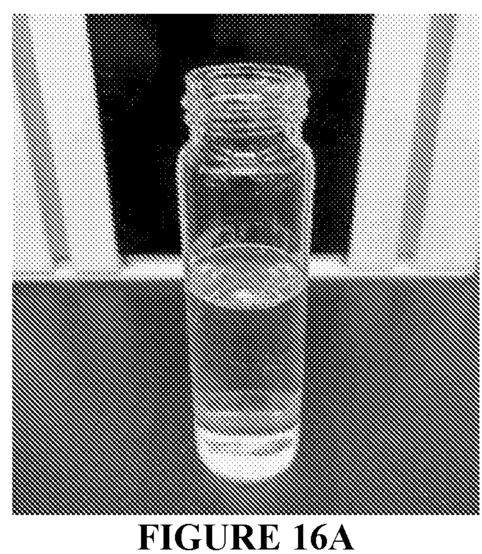
FIGS. 16A-16C are images showing the formation of precipitates during purging.
Figure 16B:
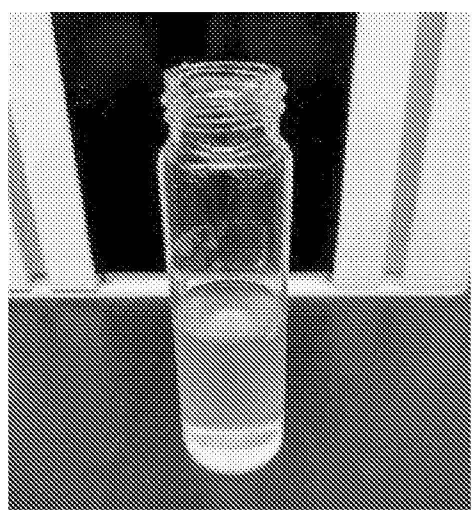
Figure 16C:
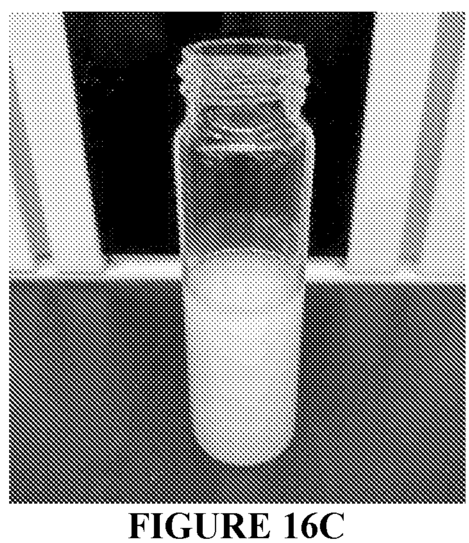

The extraction procedure was used to remobilize the retained REEs from two spent solids, i.e., Col. B-L1/L2 and DRWP-L1. Col. B L1/L2 is the mixture of the spent solids collected from the first and second layers of the Column B. By analyzing the concentrations of REEs in the solid residual and lixiviant, the partitioning of individual and total REEs after the extraction can be estimated. The sum of the total REEs observed in the solid residual and lixiviant was compared to the amounts of REEs in the spent solids (FIG. 14). All non-detects were replaced by half of the respective detection limits. As demonstrated in FIG. 14, the differences between the T-REEs in the spent solids and the sum of T-REEs in solid residual and lixiviant range from 6.6 to 14.6%.

To optimize the extraction process, the extraction procedure was tested under different sodium dithionite dosages, pH buffering conditions, and liquid-to-solid ratios (Table 3). Results obtained from the extraction tests are shown in FIG. 15. The extraction efficiency shown in the figure was calculated using the following equation:

$$\text{Extraction Efficiency, } \% = \frac{C_{lx,i} \times V_{lx}}{C_{ss,i} \times m_{ss}} \times 100\% \quad \text{(eq.5)}$$

where $C_{ss,i}$ and $C_{lx,i}$ are the concentrations of REE, i, in the spent solids and lixiviant, respectively; $m_{ss}$ is the amount of spent solids used in the extraction process; and $V_{lx}$ is the volume of lixiviant.

As the results indicate in the series of investigating the effect of sodium dithionite dose (FIG. 15), the extraction efficiency was not affected when the dose strength was decreased from 3/1 (dithionite to spent solid) to 1/1. The extraction efficiency decreased to approximately 50% when no sodium dithionite was added.

To test the effect of buffering, an extraction process was performed without adding sodium bicarbonate (FIG. 15) and obtained slightly better extraction efficiency. The change of pH during the extraction process was found to be insignificant, which implies that buffering is not necessary.

Figure 17:
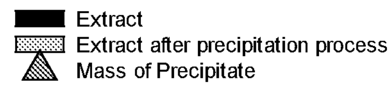
FIG. 17 is a plot illustrating the precipitation of REE concentrate from aeration process from selected aeration batches.
Figure 17:
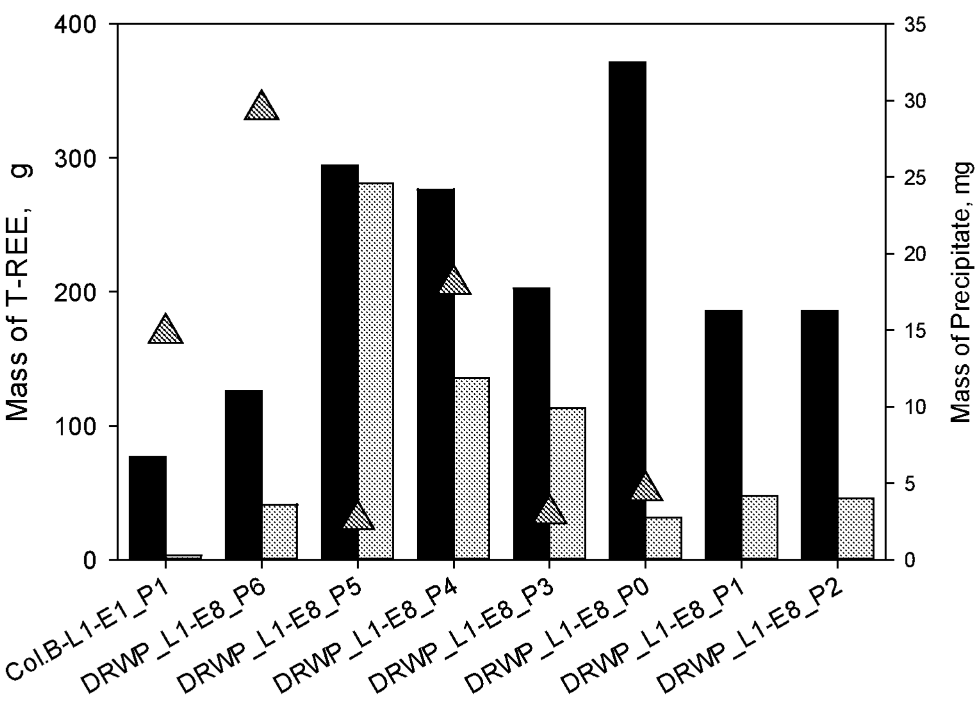
Figure 18:
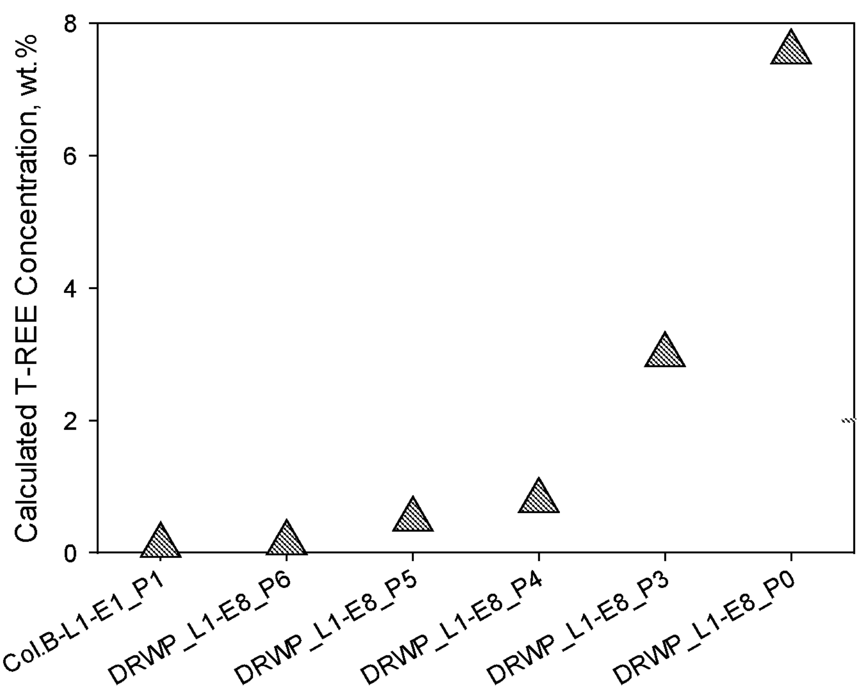
FIG. 18 is a plot showing the calculated T-REEe concentration in REE concentrates.

To optimize the use of citrate extraction solution, a series of extraction processes were performed using different solid-to-extractant (S/L) ratios ranging from (1/40 to 1/10) and evaluated the extraction efficiency (FIG. 15). No change in extraction efficiency was observed when the S/L ratio was increased from 1/40 to 1/30. The extraction efficiency significantly decreased with higher ratio Forming REE Concentrate by Aeration The extracts produced from the extraction procedures of E1 and E8 were purged with air with various flow rates and duration to observe the effects on the formation of REE concentrates (FIG. 15). After purging, precipitate was recovered by filtrating the extract using a 0.45 μm filter and dried in an oven at 105° C. The amounts of precipitates formed during the purging process were determined gravimetrically and the results are shown in FIG. 17. Also shown in the figure are the amounts of REEs in the extract before and after purging. Since the amounts of precipitate formed during the purging process are limited, the concentration of T-REEs in the solids was determined based on the principal of mass balance. As shown in FIG. 17, currently, we are able to precipitate over 90% of the extracted REEs and form a REE concentrate with the T-REEe concentration of approximately 7.5% wt. See FIG. 18.

The methods of the appended claims are not limited in scope by the specific methods described herein, which are intended as illustrations of a few aspects of the claims. Any methods that are functionally equivalent are intended to fall within the scope of the claims. Various modifications of the methods in addition to those shown and described herein are intended to fall within the scope of the appended claims. Further, while only certain representative method steps disclosed herein are specifically described, other combinations of the components and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

What is claimed is:

1. A method comprising:

contacting an aqueous solution comprising one or more rare earth elements (REEs) with a solid sequestration media to provide an REE-containing solid feedstock; and contacting the solid feedstock with an extraction solution to generate a rare earth element (REE) solution;

wherein the extraction solution comprises a chelating agent and a dithionite reducing agent.

2. The method of claim 1, wherein the aqueous solution comprises acid mine drainage (AMD).

3. The method of claim 1, wherein contacting the aqueous solution with the solid sequestration media comprises flowing the aqueous solution through a fixed bed comprising the solid sequestration media.

4. The method of claim 3, wherein the method further comprises constructing a fixed bed comprising the solid sequestration media in proximity to a mine emitting AMD, and fluidly connecting the fixed bed to the mine such that AMD emitted from the mine flows through the fixed bed.

5. The method of claim 1, wherein the chelating agent comprises a polydentate carboxylate ligand such as citrate.

6. The method of claim 1, wherein the method further comprises concentrating the REE solution.

7. The method of claim 1, wherein the method further comprises separating the REEs from the REE solution to form a rare earth oxide (REO) feedstock.

8. The method of claim 7, wherein the concentration of REEs in the REO feedstock is at least twenty times greater than the concentration of REEs in the solid feedstock.

9. The method of claim 7, wherein the ratio of the concentration of REEs in the REO feedstock to the to the concentration of REEs of the solid feedstock is from 20:1 to 100:1.

10. The method of claim 1, wherein the concentration of REEs in the aqueous solution is less than 1,000 ppm.

11. The method of claim 1, wherein the concentration of REEs in the solid feedstock is less than 1000 ppm.

12. The method of claim 1, wherein the concentration of REEs in the REE solution is at least ten times greater than the concentration of REEs in the solid feedstock.

13. The method of claim 1, wherein the solid sequestration media comprises an inorganic industrial waste material.

14. The method of claim 1, wherein the solid sequestration media comprises calcium sulfate, calcium sulfite, calcium carbonate, calcium hydroxide, aluminium silicate, iron oxide, or a combination thereof.

15. The method of claim 1, wherein the solid sequestration media comprises a stabilized flue gas desulfurization (sFGD) material.

16. The method of claim 1, wherein the solid sequestration media comprises a sludge by-product from a water treatment process, such as lime sludge.

17. A method for remediating an abandoned mine site, the method comprising:

constructing a fixed bed comprising a solid sequestration media in proximity to a mine emitting acid mine drainage (AMD)

fluidly connecting the fixed bed to the mine such that AMD emitted from the mine flows through the fixed bed;

burying the fixed bed;

allowing the AMD to contact the solid sequestration media within the fixed bed to provide a rare earth element-containing (REE-containing) solid feedstock within the fixed bed;

removing the REE-containing solid feedstock from the fixed bed; and contacting the REE-containing solid feedstock with an extraction solution to generate a rare earth element (REE) solution; and separating the REEs from the REE solution to form a rare earth oxide (REO) feedstock.

18. The method of claim 17, wherein the solid sequestration media comprises an inorganic industrial waste material, calcium sulfate, calcium sulfite, calcium carbonate, calcium hydroxide, aluminium silicate, iron oxide, stabilized flue gas desulfurization (sFGD) material, a sludge by-product from a water treatment process, such as lime sludge, or a combination thereof.

19. The method of claim 17, wherein the fixed bed comprises a geotextile drainage system that fluidly connects the fixed bed to the mine.

* * * * *